United States Patent [19]

Strang, Jr.

[11] Patent Number: 5,627,946

[45] Date of Patent: May 6, 1997

[54] HARD DISK FORMAT USING FRAMES OF SECTORS TO OPTIMIZE LOCATION OF SERVO BURSTS

[75] Inventor: Clifford E. Strang, Jr., San Jose, Calif.

[73] Assignee: Adaptec, Inc., Milpitas, Calif.

[21] Appl. No.: 636,296

[22] Filed: Apr. 23, 1996

Related U.S. Application Data

[62] Division of Ser. No. 145,037, Oct. 28, 1993, which is a continuation of Ser. No. 704,568, May 17, 1991, abandoned.

[51] Int. Cl.$^6$ .................................................. G11B 5/596
[52] U.S. Cl. ........................ 360/77.08; 360/77.01; 360/78.01; 360/78.14; 360/86; 360/97.01; 360/135; 360/109; 360/51; 395/439
[58] Field of Search .................... 360/77.01, 77.08, 360/78.01, 78.14, 86, 97.01, 135, 109, 51; 369/44.11, 44.26; 395/439, 414, 421.03, 421.01

[56] References Cited

U.S. PATENT DOCUMENTS

| | | | |
|---|---|---|---|
| 4,016,603 | 4/1977 | Ottesen | 360/135 |
| 4,048,660 | 9/1977 | Dennison et al. | 360/77 |
| 5,073,834 | 12/1991 | Best et al. | 360/77.08 |

*Primary Examiner*—Tod R. Swann
*Assistant Examiner*—J. Peikari
*Attorney, Agent, or Firm*—Skjerven, Morrill, MacPherson, Franklin & Friel LLP; Brian D. Ogonowsky

[57] ABSTRACT

A hard disk format is disclosed which sequentially arranges a number of different sector types, each having a different format, into frames which are repeated around the tracks of a magnetic disk. The sector types and frame arrangements are chosen so that servo bursts are optimally located around the tracks of a magnetic disk. The sectors of the magnetic disk may have servo bursts located virtually anywhere within each sector. A magnetic disk controller used in conjunction with the magnetic disk processes each sector during reading from or writing to a sector according to whether or not the sector contains a servo burst.

10 Claims, 34 Drawing Sheets

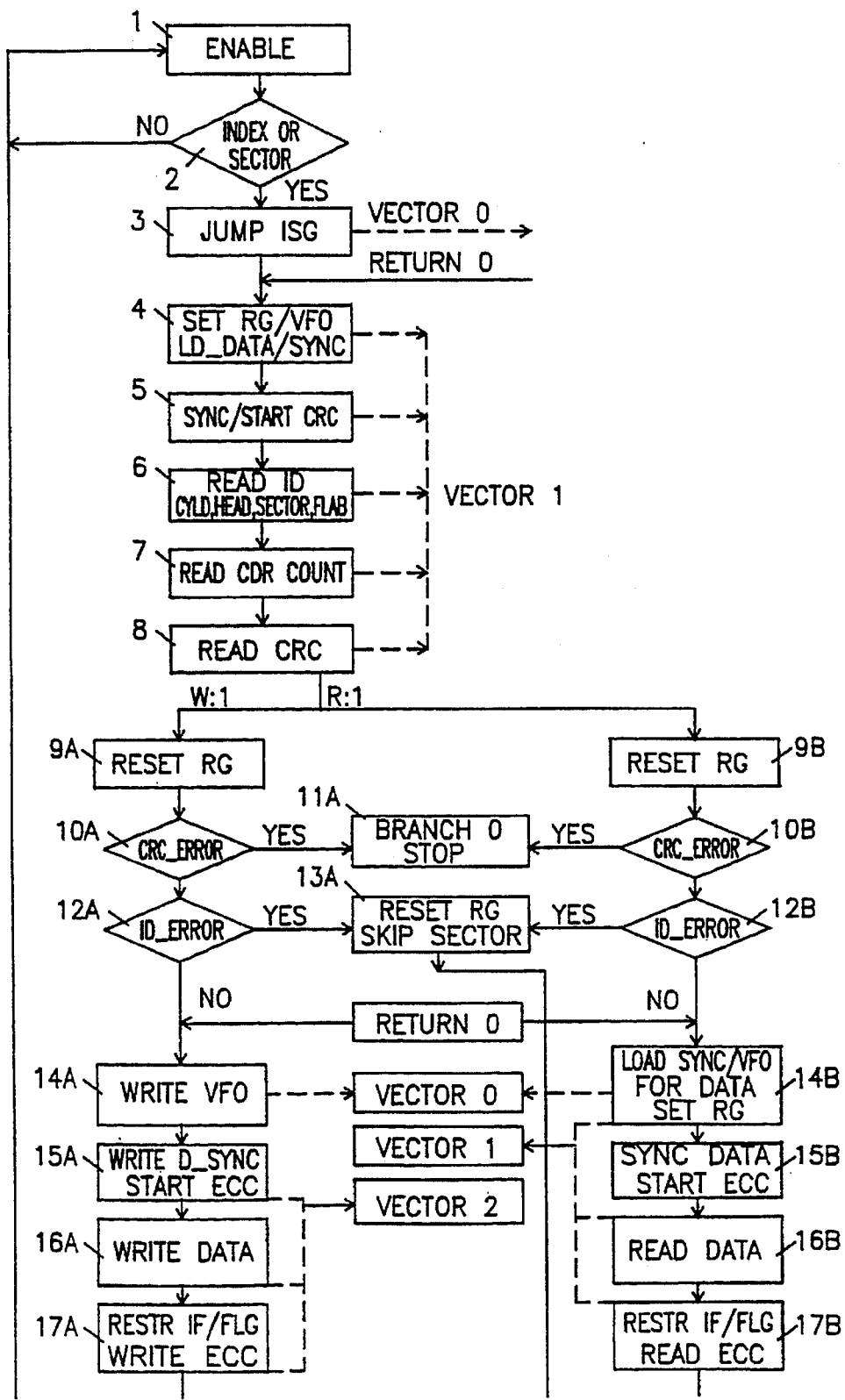
FIG. 6a1    READ – WRITE CDR FLOW CHART

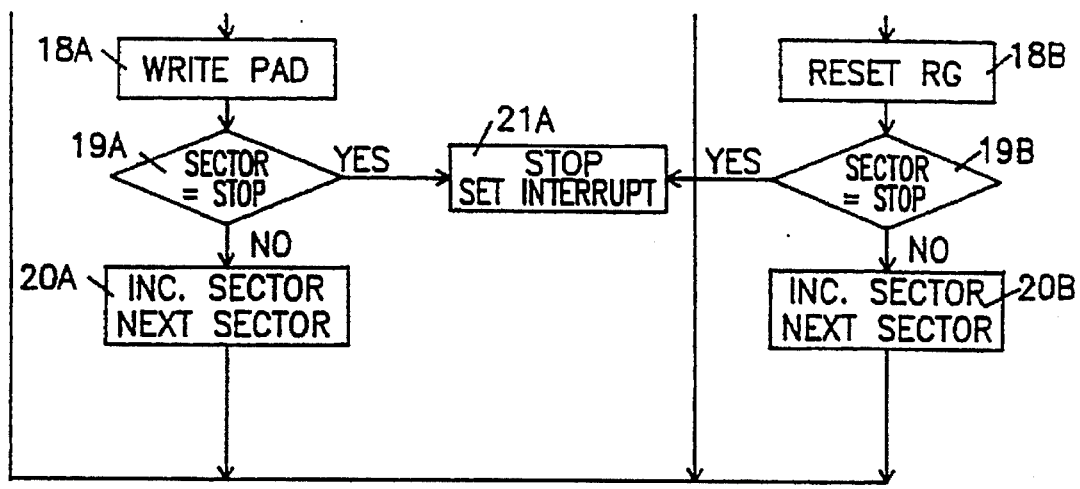
FIG. 6a2     READ – WRITE CDR FLOW CHART

VECTOR 0

```
┌─────────────────┐
│ RESET RG        │
│ JUMP SERVO      │
└─────────────────┘
         ↓
     RETURN 0
```

FIG. 6b

VECTOR 1

```
┌─────────────────────┐
│ FREEZE ECC/CRC      │
│ RESET RG            │
│ JUMP SERVO          │
└─────────────────────┘
         ↓
┌─────────────────────┐
│ SET RG/ VFO         │
└─────────────────────┘
         ↓
┌─────────────────────┐
│ SYNC/ECC OR CRC     │
│ START/ECC OR CRC    │
└─────────────────────┘
         ↓
┌─────────────────────┐
│ RETURN              │
└─────────────────────┘
```

FIG. 6c

VECTOR 2

```
┌─────────────────────┐
│ WRITE PAD           │
└─────────────────────┘
         ↓
┌─────────────────────┐
│ FREEZE ECC/CRC      │
│ RESET WG            │
│ JUMP SERVO          │
└─────────────────────┘
         ↓
┌─────────────────────┐
│ WRITE VFO           │
└─────────────────────┘
         ↓
┌─────────────────────┐
│ WRITE D_SYNC        │
│ START ECC           │
└─────────────────────┘
         ↓
┌─────────────────────┐
│ RETURN              │
└─────────────────────┘
```

FIG. 6d

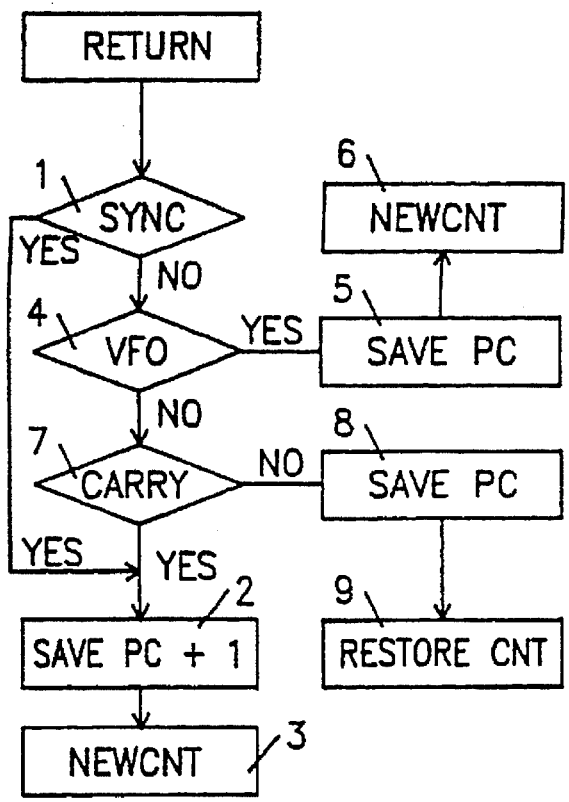

FIG. 6e

FIG. 7a    CDR-SOFT SECTORED DISK SEQUENCER MAP

| SEQ ADDR | ADDR LABEL | SEQDB/NXTADD | | SEQCTL | | | |
|---|---|---|---|---|---|---|---|
| 00 | START | 001 | "START" | 0 | 00 | 00 | 000 |
| 01 | STRID | A1 | | 0 | 01 | 00 | 111 |
| 02 | | 010 | "STOP" | 0 | 00 | 00 | 010 |
| 03 | | CYLD-I | | 0 | 00 | 10 | 000 |
| 04 | | CYLD-II | | 0 | 00 | 10 | 000 |
| 05 | | HEAD | | 0 | 00 | 10 | 000 |
| 06 | | ------ | | 0 | 00 | 10 | 101 |
| 07 | | FLAG | | 0 | 00 | 11 | 000 |
| 08 | | 00 | | 0 | 00 | 00 | 000 |
| 09 | | 000 | "READ" | 0 | 00 | 00 | 100 |
| 0A | | 101 | "NXTID" | 0 | 11 | 00 | 000 |
| 0B | | 00 | | 0 | 10 | 00 | 111 |
| 0C | | A0 | | 0 | 00 | 00 | 011 |
| 0D | "READ2" | 00 | | 0 | 00 | 00 | 001 |
| 0E | | 00 | | 0 | 00 | 00 | 001 |
| 0F | | 000 | "ENDSEC" | 0 | 00 | 00 | 100 |
| 10 | | 00 | | 0 | 00 | 00 | 000 |
| 11 | ENDSEC | 111 | "STOP" | 0 | 11 | 00 | 000 |
| 12 | | 001 | "STOP" | 0 | 00 | 00 | 000 |
| 13 | | 000 | "STRID" | 0 | 00 | 00 | 110 |
| 14 | VECTOR2 | 00 | | 0 | 00 | 00 | 000 |
| 15 | VECTOR1 | 000 | "VECRD" | 0 | 11 | 00 | 000 |
| 16 | | 00 | | 0 | 10 | 00 | 000 |
| 17 | | A0 | | 0 | 00 | 00 | 000 |
| 18 | "VECRD" | A0 | | 0 | 01 | 00 | 111 |

FIG. 7b  CDR-SOFT SECTORED DISK SEQUENCER MAP

| SEQCNT | XCTL | | | | COMMENT |
|---|---|---|---|---|---|
| 00 | 1 | 00 | 00 | 000 | WAIT FOR INDEX + SECTOR/EN ADD MARK |
| 07 | 0 | 01 | 00 | 001 | SET RG FOR VFO/LOAD SYNC |
| 04 | 1 | 00 | 00 | 000 | WAIT FOR SYNC/START CRC |
| 00 | 0 | 00 | 00 | 000 | READ CYLD I/PUSH & COMP |
| 00 | 0 | 00 | 00 | 000 | READ CYLD II/PUSH & COMP |
| 00 | 0 | 00 | 00 | 000 | READ HEAD/PUSH & COMP |
| 00 | 0 | 00 | 00 | 000 | READ SECTOR/PUSH & COMP/EN SECTOR |
| 00 | 0 | 10 | 00 | 110 | READ FLAG/PUSH & FLAG COMP |
| 03 | 0 | 10 | 11 | 000 | READ CDR COUNTS/EN FIFO |
| 01 | W=0 R=1 | 10 | 00 | 000 | READ CRC BYTES |
| 00 | 1 | 10 | 00 | 000 | BRCH IDER+CRCER+NRM/NXT ID/RS RG |
| 0B | 0 | 10 | 00 | 011 | WRITE VFO FOR DATA/ SET WRITE GATE |
| 00 | 0 | 10 | 00 | 000 | WRITE DATA SYNC/START ECC |
| 01 | 0 | 00 | 00 | 000 | WRITE DATA |
| 87 - 512 | 0 | 00 | 00 | 000 | WRITE DATA |
| 0A | W=0 R=1 | 00 | 00 | 000 | WRITE ECC |
| 01 | 0 | 00 | 00 | 000 | WRITE TWO PAD BYTES |
| 00 | 1 | 00 | 00 | 000 | BRANCH ON SECTOR-STOP |
| INT SECTOR GAP | 1 | 00 | 00 | 100 | WAIT FOR AM/EN ADD MARK |
| 00 | 1 | 00 | 00 | 000 | BRANCH TO START/INC. SECTOR |
| 01 | 0 | 00 | 00 | 000 | WRITE VECTOR/WRITE TWO PAD BYTES |
| SERVO GAP | W=0 R=1 | 00 | 00 | 000 | READ VECTOR/RESET WG/JUMP GAP |
| 0B | 0 | 00 | 00 | 000 | WRITE VFO/ SET WG |
| 00 | 0 | 00 | 10 | 000 | WRITE DATA SYNC/RESTART ECC/RETURN |
| 07 | 0 | 00 | 00 | 000 | LOAD SYNC/VFO FOR DATA/SET READ GATE |

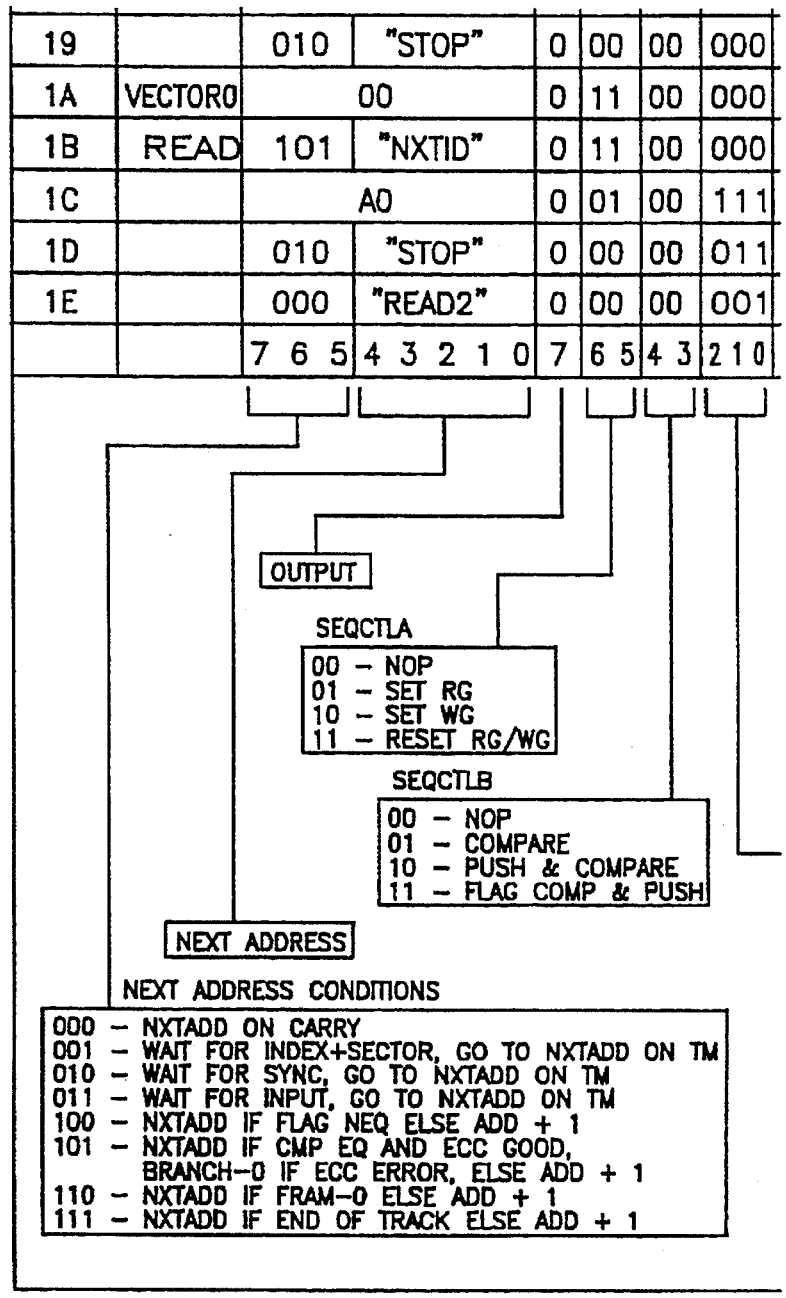
FIG. 7c   CDR-SOFT SECTORED DISK SEQUENCER MAP

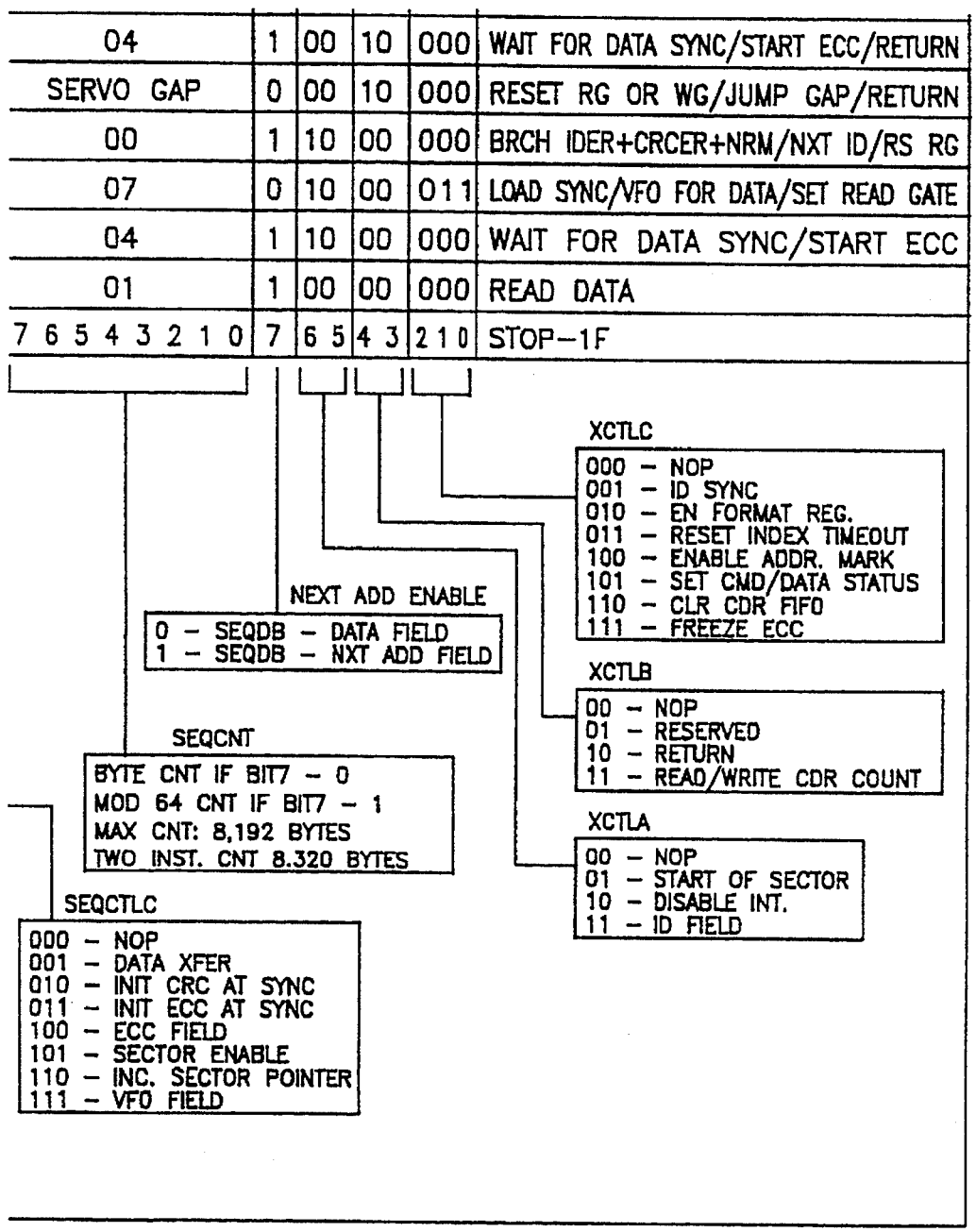
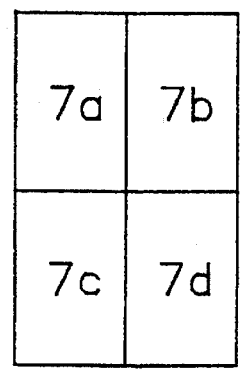
FIG. 7d    CDR-SOFT SECTORED DISK SEQUENCER MAP

FIG. 9a    CDR-SOFT SECTORED FORMAT MAP

| SEQ ADDR | ADDR LABEL | SEQDB/NXTADD | | SEQCTL | | | |
|---|---|---|---|---|---|---|---|
| 00 | START | 001 | "START" | 0 | 00 | 00 | 000 |
| 01 | | 00 | | 0 | 00 | 00 | 000 |
| 02 | NSECT | 00 | | 0 | 10 | 00 | 111 |
| 03 | | A1 | | 0 | 00 | 00 | 010 |
| 04 | | CYLD-I | | 0 | 00 | 00 | 000 |
| 05 | | CYLD-II | | 0 | 00 | 00 | 000 |
| 06 | | HEAD | | 0 | 00 | 00 | 000 |
| 07 | | ---- | | 0 | 00 | 00 | 101 |
| 08 | | FLAG | | 0 | 00 | 00 | 000 |
| 09 | | 00 | | 0 | 00 | 00 | 001 |
| 0A | | 00 | | 0 | 00 | 00 | 100 |
| 0B | | 00 | | 0 | 00 | 00 | 000 |
| 0C | | 00 | | 0 | 11 | 00 | 000 |
| 0D | DATVFO | 00 | | 0 | 10 | 00 | 111 |
| 0E | | A0 | | 0 | 00 | 00 | 011 |
| 0F | | DAT PAT1 | | 0 | 00 | 00 | 000 |
| 10 | | DAT PAT2 | | 0 | 00 | 00 | 000 |
| 11 | | 00 | | 0 | 00 | 00 | 100 |
| 12 | | 111 | "STOP" | 0 | 00 | 00 | 000 |
| 13 | ENDSEC | 00 | | 0 | 11 | 00 | 110 |
| 14 | WRTAM | 000 | "NSECT" | 0 | 10 | 00 | 000 |
| 15 | | | | | | | |
| 16 | VECTOR2 | 00 | | 0 | 00 | 00 | 000 |
| 17 | | 00 | | 0 | 11 | 00 | 000 |
| 18 | | 00 | | 0 | 10 | 00 | 111 |

FIG. 9b    CDR-SOFT SECTORED FORMAT MAP

| SEQCNT | XCTL | | | | COMMENT |
|---|---|---|---|---|---|
| 00 | 1 | 00 | 00 | 000 | WAIT FOR INDEX / START OF FORMAT |
| INT SECTOR GAP | 0 | 01 | 00 | 000 | ISG |
| 0B | 0 | 00 | 00 | 000 | LOAD DATA VFO/ SET WG FOR VFO |
| 00 | 0 | 00 | 00 | 001 | WRITE SYNC/START CRC |
| 00 | 0 | 11 | 00 | 000 | WRITE ID FIELD / CYLD-I |
| 00 | 0 | 11 | 00 | 000 | WRITE ID FIELD / CYLD-II |
| 00 | 0 | 11 | 00 | 000 | WRITE ID FIELD / HEAD |
| 00 | 0 | 11 | 00 | 000 | WRITE ID FIELD / SECTOR |
| 00 | 0 | 11 | 00 | 110 | WRITE ID FIELD / FLAG |
| 03 | 0 | 00 | 11 | 000 | WRITE ID FIELD FROM BUFFER /CDR CNTS |
| 01 | 0 | 00 | 00 | 000 | WRITE CRC |
| 01 | 0 | 00 | 00 | 000 | WRITE TWO PAD BYTES |
| 00 | 0 | 00 | 00 | 000 | RESET WG/WRITE SPLICE |
| 0B | 0 | 00 | 00 | 000 | WRITE DATA VFO/ SET WG |
| 00 | 0 | 00 | 00 | 000 | WRITE DATA SYNC/START ECC |
| 01 | 0 | 00 | 00 | 000 | WRITE DATA FILL/ RESTORE CNT IF FLAG |
| 87 - 512 | 0 | 00 | 00 | 000 | WRITE DATA FILL/ RESTORE CNT IF FLAG |
| 0A | 0 | 00 | 00 | 000 | WRITE ECC/ RESTORE CNT IF FLAG |
| 01 | 1 | 00 | 00 | 000 | WRITE PAD/STOP ON SEC - STOP |
| INT SECTOR GAP | 0 | 01 | 00 | 011 | SKIP INT SECTOR GAP/INC SECTOR |
| ADDRESS MARK | 1 | 00 | 00 | 100 | WRITE AM/BRANCH TO NEXT SECTOR |
| 01 | 0 | 00 | 00 | 000 | WRITE TWO PAD BYTES |
| SERVO GAP | 0 | 00 | 00 | 000 | RESET WG/JUMP GAP |
| 0B | 0 | 00 | 00 | 000 | WRITE VFO/ SET WG |

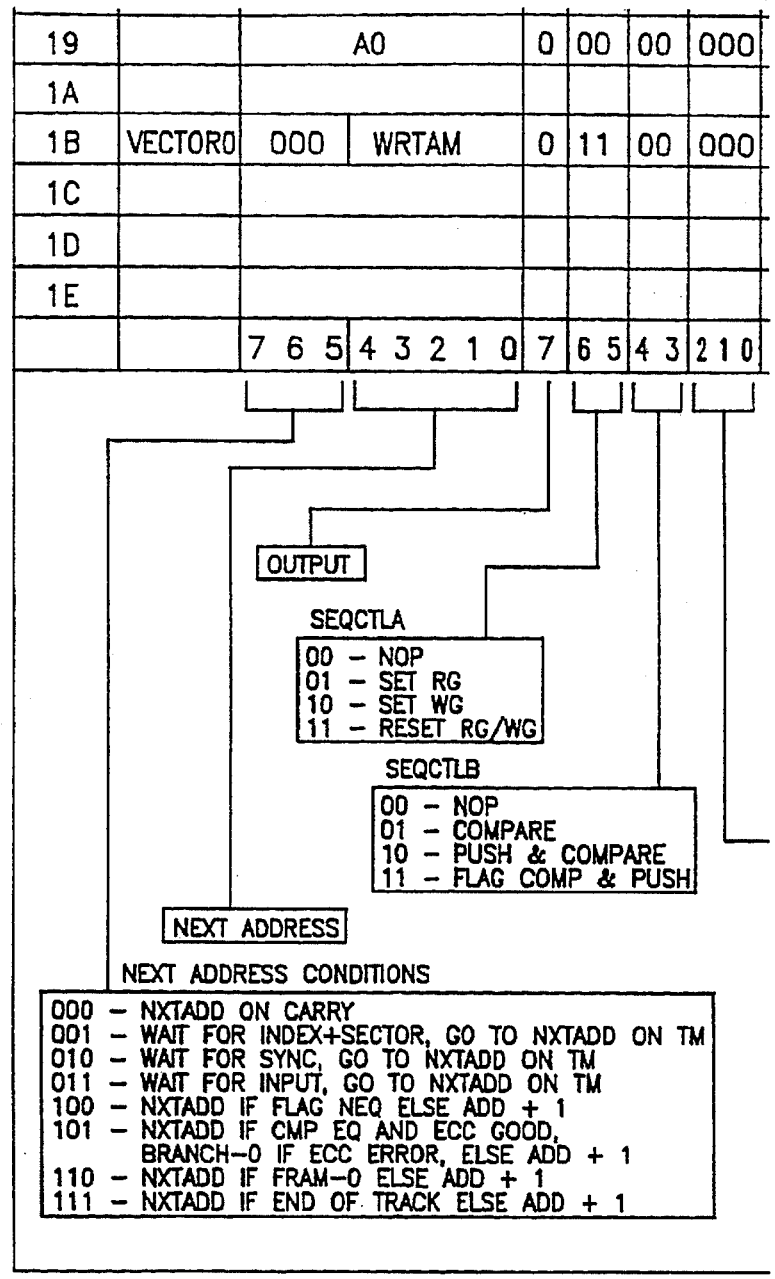
FIG. 9c    CDR-SOFT SECTORED FORMAT MAP

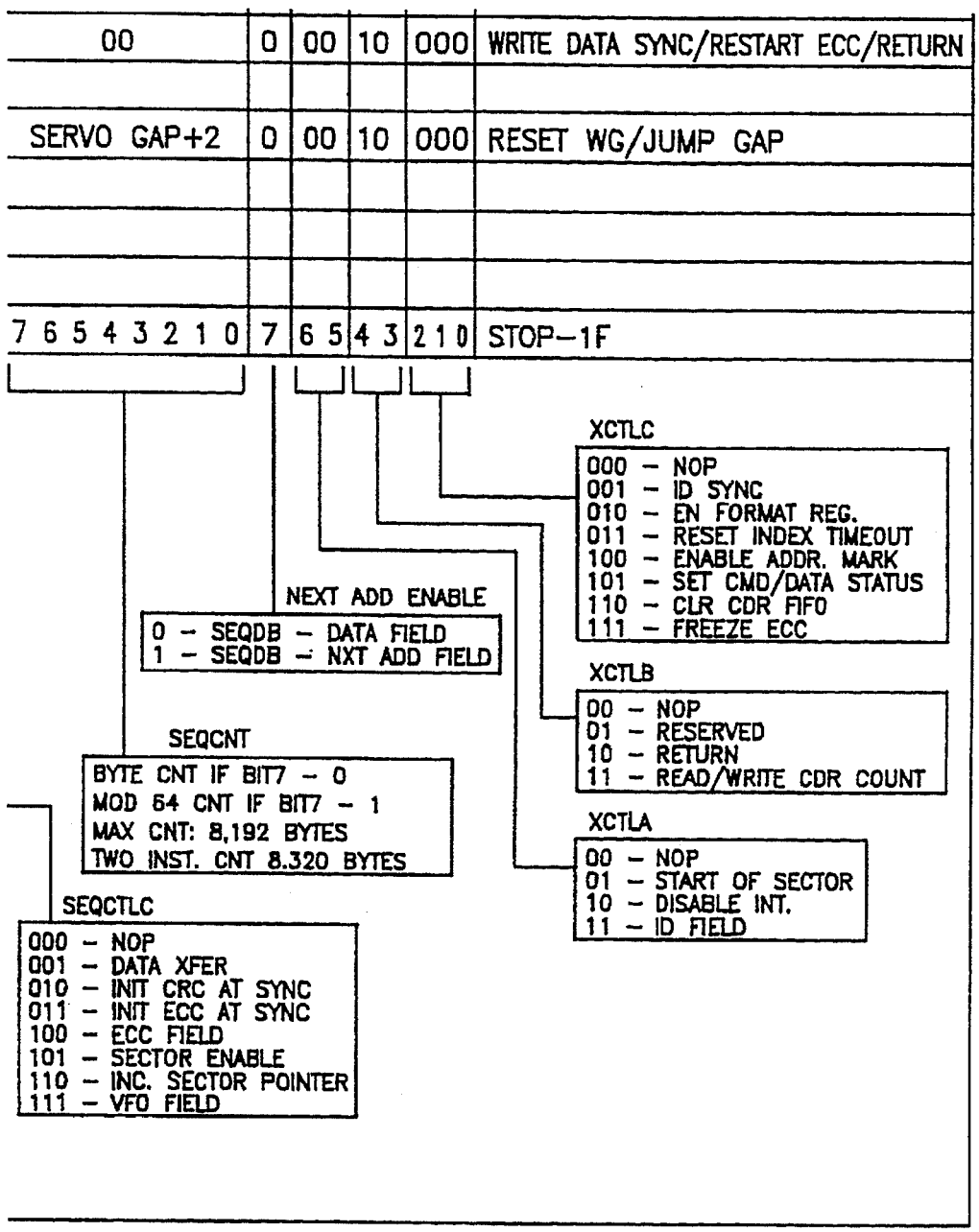
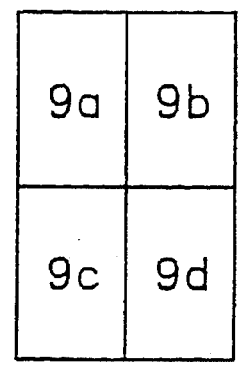
FIG. 9d  CDR-SOFT SECTORED FORMAT MAP

FIG. 10a    CDR-HARD SECTORED DISK SEQUENCER MAP

| SEQ ADDR | ADDR LABEL | SEQDB/NXTADD | | SEQCTL | | | |
|---|---|---|---|---|---|---|---|
| 00 | START | 001 | "START" | 0 | 00 | 00 | 000 |
| 01 | | 00 | | 0 | 00 | 00 | 000 |
| 02 | STRID | A1 | | 0 | 01 | 00 | 111 |
| 03 | | 010 | "STOP" | 0 | 00 | 00 | 010 |
| 04 | | CYLD-I | | 0 | 00 | 10 | 000 |
| 05 | | CYLD-II | | 0 | 00 | 10 | 000 |
| 06 | | HEAD | | 0 | 00 | 10 | 000 |
| 07 | | ------ | | 0 | 00 | 10 | 101 |
| 08 | | FLAG | | 0 | 00 | 11 | 000 |
| 09 | | 00 | | 0 | 00 | 00 | 000 |
| 0A | | 000 | "READ" | 0 | 00 | 00 | 100 |
| 0B | | 101 | "START" | 0 | 11 | 00 | 000 |
| 0C | | 00 | | 0 | 10 | 00 | 111 |
| 0D | | A0 | | 0 | 00 | 00 | 011 |
| 0E | | 00 | | 0 | 00 | 00 | 001 |
| 0F | | 00 | | 0 | 00 | 00 | 100 |
| 10 | | 00 | | 0 | 00 | 00 | 000 |
| 11 | ENDSEC | 111 | "STOP" | 0 | 11 | 00 | 000 |
| 12 | | 000 | "START" | 0 | 00 | 00 | 110 |
| 13 | READ | 101 | "START" | 0 | 11 | 00 | 000 |
| 14 | | A0 | | 0 | 01 | 00 | 111 |
| 15 | | 010 | "STOP" | 0 | 00 | 00 | 011 |
| 16 | | 00 | | 0 | 00 | 00 | 001 |
| 17 | | 000 | "ENDSEC" | 0 | 00 | 00 | 100 |
| 18 | VECTOR2 | 00 | | 0 | 00 | 00 | 000 |

FIG. 10b    CDR HARD SECTORED DISK SEQUENCER MAP

| SEQCNT | XCTL | | | | COMMENT |
|---|---|---|---|---|---|
| 00 | 1 | 00 | 00 | 100 | WAIT FOR INDEX + SECTOR/EN ADD MARK |
| INT SECTOR GAP | 0 | 00 | 00 | 000 | ISG |
| 07 | 0 | 01 | 00 | 001 | SET RG FOR VFO/LOAD SYNC |
| 04 | 1 | 00 | 00 | 000 | WAIT FOR SYNC/START CRC |
| 00 | 0 | 00 | 00 | 000 | READ CYLD I/PUSH & COMP |
| 00 | 0 | 00 | 00 | 000 | READ CYLD II/PUSH & COMP |
| 00 | 0 | 00 | 00 | 000 | READ HEAD/PUSH & COMP |
| 00 | 0 | 00 | 00 | 000 | READ SECTOR/PUSH & COMP/EN SECTOR |
| 00 | 0 | 10 | 00 | 110 | READ FLAG/PUSH & FLAG COMP |
| 01 | 0 | 10 | 11 | 000 | READ CDR COUNTS/EN FIFO |
| 01 | W=0 R=1 | 10 | 00 | 000 | READ CRC BYTES |
| 00 | 1 | 10 | 00 | 000 | BRCH IDER+CRCER+NRM/NXT ID/RS RG |
| 0B | 0 | 10 | 00 | 011 | WRITE VFO FOR DATA/ SET WRITE GATE |
| 00 | 0 | 10 | 00 | 000 | WRITE DATA SYNC/START ECC |
| 87 - 512 | 0 | 00 | 00 | 000 | WRITE DATA |
| 0A | 0 | 00 | 00 | 000 | WRITE ECC |
| 01 | 0 | 00 | 00 | 000 | WRITE TWO PAD BYTES |
| 00 | 1 | 00 | 00 | 000 | BRANCH ON SECTOR-STOP |
| 00 | 1 | 00 | 00 | 000 | BRANCH TO START/INC. SECTOR |
| 00 | 1 | 00 | 00 | 000 | BRCH IDER+CRCER+NRM/NXT ID/RS RG |
| 07 | 0 | 10 | 00 | 011 | LOAD SYNC/VFO FOR DATA/SET READ GATE |
| 04 | 1 | 10 | 00 | 000 | WAIT FOR DATA SYNC/START ECC |
| 87 - 512 | 0 | 00 | 00 | 000 | READ DATA |
| 0A | 1 | 00 | 00 | 000 | READ ECC |
| 01 | 0 | 00 | 00 | 000 | WRITE TWO PAD BYTES |

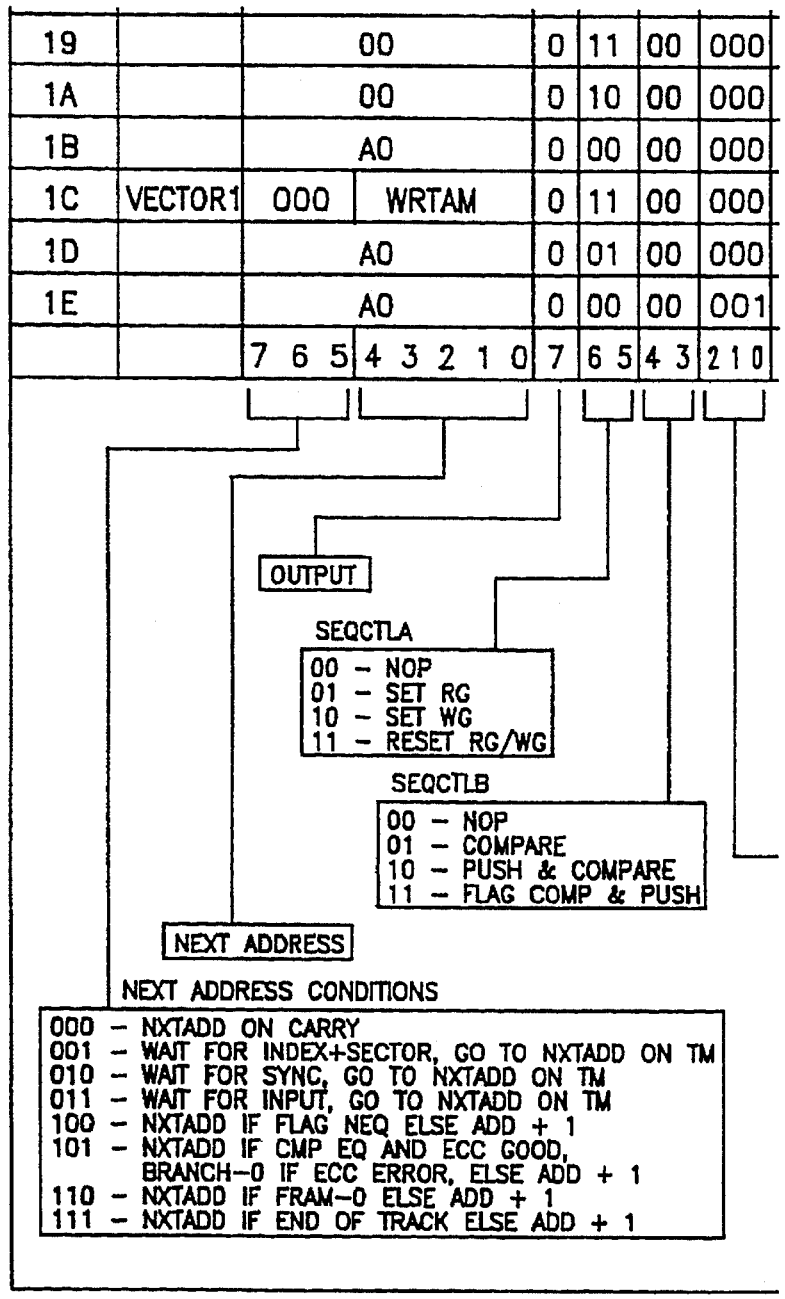
FIG. 10c   CDR-HARD SECTORED DISK SEQUENCER MAP

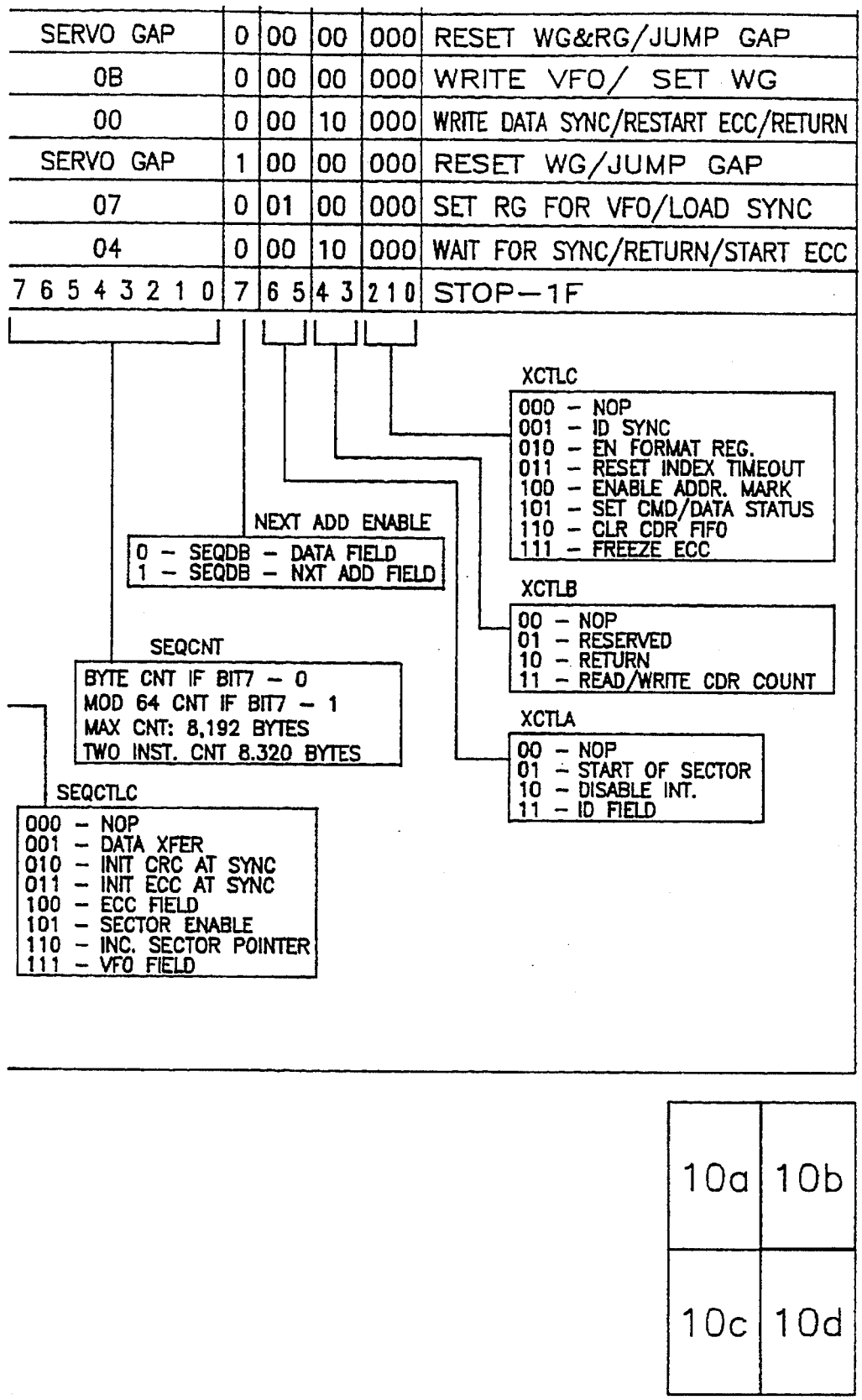
FIG. 10d    CDR-HARD SECTORED DISK SEQUENCER MAP

FIG. 11a    CDR-HARD SECTORED FORMAT MAP

| SEQ ADDR | ADDR LABEL | SEQDB/ NXTADD | | SEQCTL | | | |
|---|---|---|---|---|---|---|---|
| 00 | START | 001 | "START" | 0 | 00 | 00 | 000 |
| 01 | | 00 | | 0 | 00 | 00 | 000 |
| 02 | NXTSEC | 00 | | 0 | 10 | 00 | 111 |
| 03 | | A1 | | 0 | 00 | 00 | 010 |
| 04 | | CYLD-I | | 0 | 00 | 00 | 000 |
| 05 | | CYLD-II | | 0 | 00 | 00 | 000 |
| 06 | | HEAD | | 0 | 00 | 00 | 000 |
| 07 | | ---- | | 0 | 00 | 00 | 101 |
| 08 | | FLAG | | 0 | 00 | 00 | 000 |
| 09 | | 00 | | 0 | 00 | 00 | 001 |
| 0A | | 00 | | 0 | 00 | 00 | 100 |
| 0B | | 00 | | 0 | 00 | 00 | 000 |
| 0C | | 00 | | 0 | 11 | 00 | 000 |
| 0D | DATVFO | 00 | | 0 | 10 | 00 | 111 |
| 0E | | A0 | | 0 | 00 | 00 | 011 |
| 0F | | DAT PAT1 | | 0 | 00 | 00 | 000 |
| 10 | | 00 | | 0 | 00 | 00 | 100 |
| 11 | | 111 | "STOP" | 0 | 00 | 00 | 000 |
| 12 | | 001 | "STOP" | 0 | 11 | 00 | 110 |
| 13 | | 000 | "NXTSEC" | 0 | 00 | 00 | 000 |
| 14 | | | | | | | |
| 15 | VECTOR2 | 00 | | 0 | 00 | 00 | 000 |
| 16 | | 00 | | 0 | 11 | 00 | 000 |
| 17 | | 00 | | 0 | 10 | 00 | 111 |
| 18 | | A0 | | 0 | 00 | 00 | 000 |

FIG. 11b   CDR-HARD SECTORED FORMAT MAP

| SEQCNT | XCTL | | | | COMMENT |
|---|---|---|---|---|---|
| 00 | 1 | 00 | 00 | 100 | WAIT FOR INDEX/ START OF FORMAT |
| INT SECTOR GAP | 0 | 01 | 00 | 000 | ISG |
| 0B | 0 | 00 | 00 | 000 | LOAD DATA VFO/ SET WG FOR VFO |
| 00 | 0 | 00 | 00 | 001 | WRITE SYNC/START CRC |
| 00 | 0 | 00 | 00 | 000 | WRITE ID FIELD / CYLD-I |
| 00 | 0 | 00 | 00 | 000 | WRITE ID FIELD / CYLD-II |
| 00 | 0 | 00 | 00 | 000 | WRITE ID FIELD / HEAD |
| 00 | 0 | 00 | 00 | 000 | WRITE ID FIELD / SECTOR |
| 00 | 0 | 00 | 00 | 110 | WRITE ID FIELD / FLAG |
| 01 | 0 | 00 | 11 | 000 | WRITE ID FIELD FROM BUFFER /CDR CNTS |
| 01 | 0 | 00 | 00 | 000 | WRITE CRC |
| 01 | 0 | 00 | 00 | 000 | WRITE TWO PAD BYTES |
| 00 | 0 | 00 | 00 | 000 | RESET WG/WRITE SPLICE |
| 0B | 0 | 00 | 00 | 000 | WRITE DATA VFO/ SET WG |
| 00 | 0 | 00 | 00 | 000 | WRITE DATA SYNC/START ECC |
| 87 - 512 | 0 | 00 | 00 | 000 | WRITE DATA FILL/ RESTORE CNT IF FLAG |
| 0A | 0 | 00 | 00 | 000 | WRITE ECC/ RESTORE CNT IF FLAG |
| 01 | 1 | 00 | 00 | 000 | WRITE PAD/STOP ON SEC - STOP |
| MAX ISG | 1 | 01 | 00 | 011 | WAIT FOR SECTOR MARK/ INC. SECTOR |
| INT SECTOR GAP | 1 | 00 | 00 | 000 | ISG JUMP TO WRITE ID |
| | | | | | |
| 01 | 0 | 00 | 00 | 000 | WRITE TWO PAD BYTES |
| SERVO GAP | 0 | 00 | 00 | 000 | RESET WG/JUMP GAP |
| 0B | 0 | 00 | 00 | 000 | WRITE VFO/ SET WG |
| 00 | 0 | 00 | 10 | 000 | WRITE DATA SYNC/RESTART ECC/RETURN |

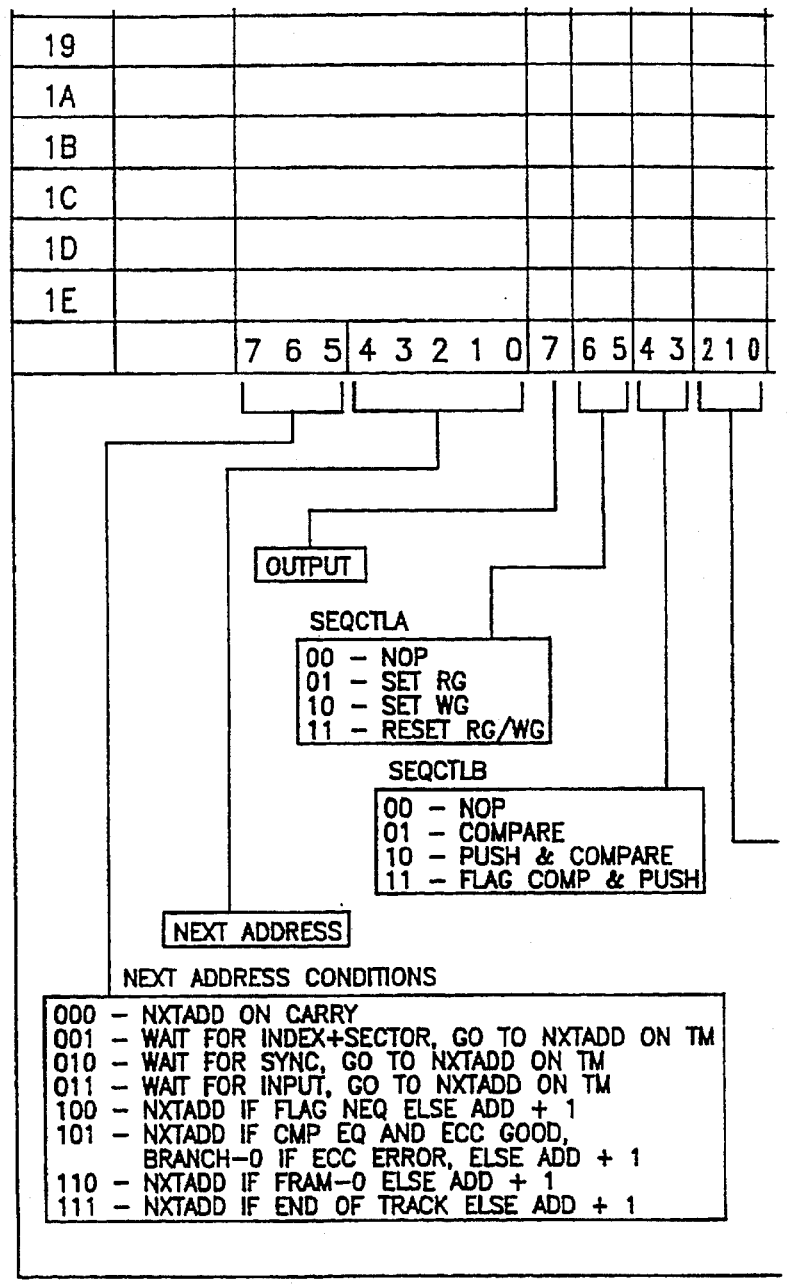
FIG. 11c   CDR-HARD SECTORED FORMAT MAP

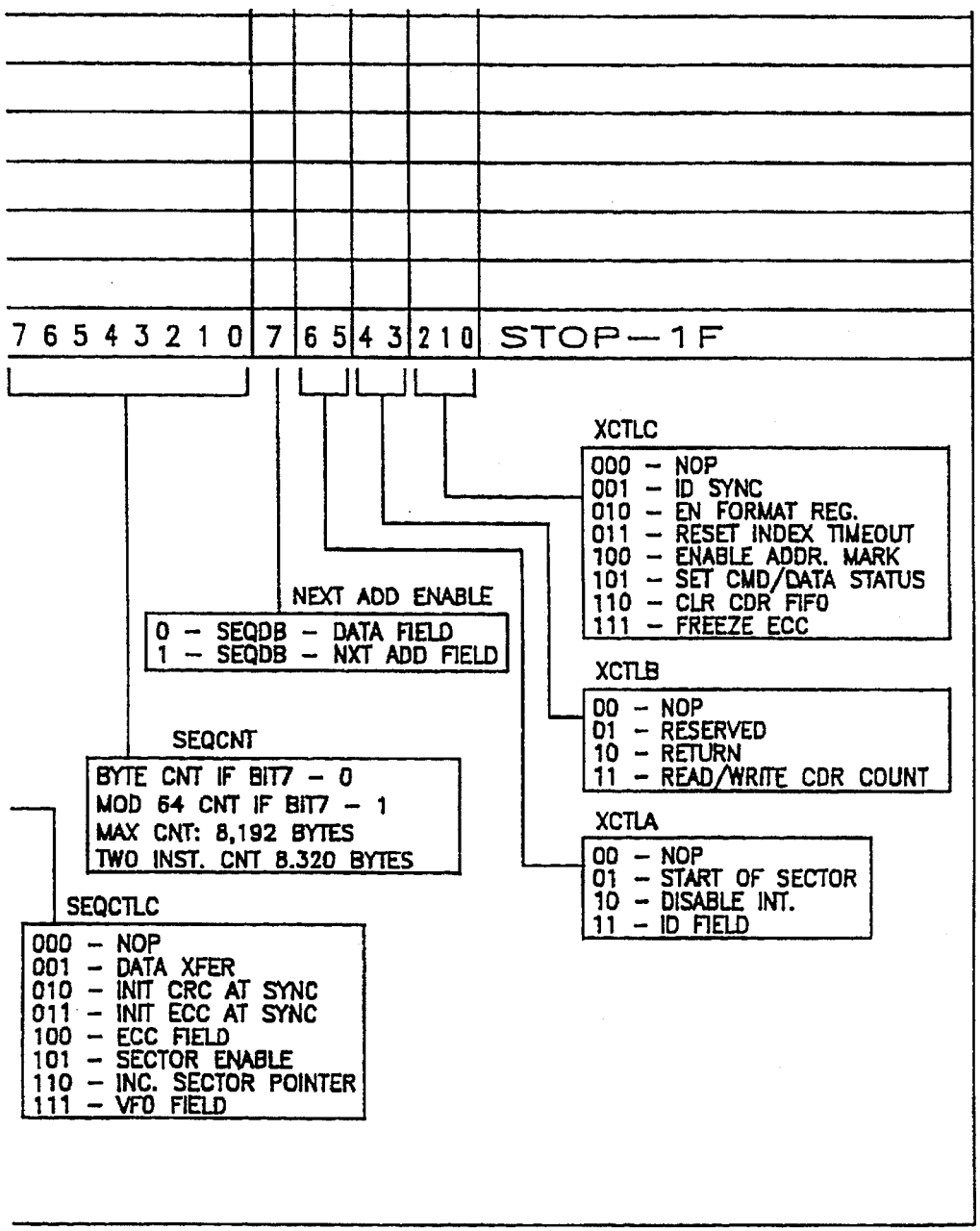
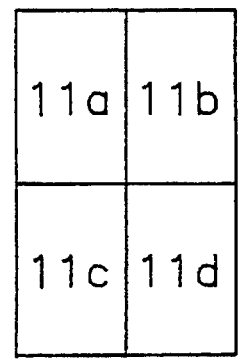
FIG. 11d  CDR-HARD SECTORED FORMAT MAP

FIG. 14a    FRAM – CDR SOFT SECTORED FORMAT MAP

| SEQ ADDR | ADDR LABEL | SEQDB/ NXTADD | | SEQCTL | | | |
|---|---|---|---|---|---|---|---|
| 00 | START | 001 | "START" | 0 | 00 | 00 | 000 |
| 01 | | 00 | | 0 | 00 | 00 | 000 |
| 02 | NSECT | 00 | | 0 | 10 | 00 | 111 |
| 03 | | A1 | | 0 | 00 | 00 | 010 |
| 04 | | CYLD-I | | 0 | 00 | 00 | 000 |
| 05 | | CYLD-II | | 0 | 00 | 00 | 000 |
| 06 | | HEAD | | 0 | 00 | 00 | 000 |
| 07 | | ------ | | 0 | 00 | 00 | 101 |
| 08 | | FLAG | | 0 | 00 | 00 | 000 |
| 09 | | 00 | | 0 | 00 | 00 | 001 |
| 0A | | 00 | | 0 | 00 | 00 | 100 |
| 0B | | 00 | | 0 | 00 | 00 | 000 |
| 0C | | 00 | | 0 | 11 | 00 | 000 |
| 0D | DATVFO | 00 | | 0 | 10 | 00 | 111 |
| 0E | | A0 | | 0 | 00 | 00 | 011 |
| 0F | | DAT PAT | | 0 | 00 | 00 | 000 |
| 10 | | 00 | | 0 | 00 | 00 | 100 |
| 11 | | 111 | "STOP" | 0 | 00 | 00 | 000 |
| 12 | ENDSEC | 110 | "NEWFRAM" | 0 | 11 | 00 | 110 |
| 13 | WRTAM | 000 | "NSECT" | 0 | 10 | 00 | 000 |
| 14 | NEWFRAM | 000 | "WRTAM" | 0 | 00 | 00 | 000 |
| 15 | | | | | | | |
| 16 | VECTOR2 | 00 | | 0 | 00 | 00 | 000 |
| 17 | | 00 | | 0 | 11 | 00 | 000 |
| 18 | | 00 | | 0 | 10 | 00 | 111 |

FIG. 14b    FRAM — CDR SOFT SECTORED FORMAT MAP

| SEQCNT | XCTL | | | | COMMENT |
|---|---|---|---|---|---|
| FF | 1 | 00 | 00 | 100 | WAIT FOR INDEX/ START OF FORMAT |
| SERVO GAP | 0 | 01 | 00 | 000 | STARTING SERVO |
| 0B | 0 | 00 | 00 | 000 | LOAD DATA VFO/ SET WG FOR VFO |
| 00 | 0 | 00 | 00 | 001 | WRITE SYNC/START CRC |
| 00 | 0 | 00 | 00 | 000 | WRITE ID FIELD / CYLD-I |
| 00 | 0 | 00 | 00 | 000 | WRITE ID FIELD / CYLD-II |
| 00 | 0 | 00 | 00 | 000 | WRITE ID FIELD / HEAD |
| 00 | 0 | 00 | 00 | 000 | WRITE ID FIELD / SECTOR |
| 00 | 0 | 00 | 00 | 110 | WRITE ID FIELD / FLAG |
| 01 | 0 | 00 | 11 | 000 | WRITE ID FIELD FROM BUFFER /CDR CNT |
| 01 | 0 | 00 | 00 | 000 | WRITE CRC |
| 01 | 0 | 00 | 00 | 000 | WRITE TWO PAD BYTES |
| 00 | 0 | 00 | 00 | 000 | RESET WG/WRITE SPLICE |
| 0B | 0 | 00 | 00 | 000 | WRITE DATA VFO/ SET WG |
| 00 | 0 | 00 | 00 | 000 | WRITE DATA SYNC/START ECC |
| 87 – 512 | 0 | 00 | 00 | 000 | WRITE DATA FILL/ RESTORE CNT IF FLAG |
| 0A | 0 | 00 | 00 | 000 | WRITE ECC/ RESTORE CNT IF FLAG |
| 01 | 1 | 00 | 00 | 000 | WRITE PAD/STOP ON SEC – STOP |
| INT SECTOR GAP | 0 | 01 | 00 | 011 | SKIP INT SECTOR GAP/INC SECTOR |
| ADDRESS MARK | 1 | 00 | 00 | 100 | WRITE AM/BRANCH TO NEXT SECTOR |
| SERVO GAP | 0 | 01 | 00 | 000 | SERVO/ NEW FRAM |
| | | | | | |
| 01 | 0 | 00 | 00 | 000 | WRITE TWO PAD BYTES |
| SERVO GAP | 0 | 00 | 00 | 000 | RESET WG/JUMP GAP |
| 0B | 0 | 00 | 00 | 000 | WRITE VFO/ SET WG |

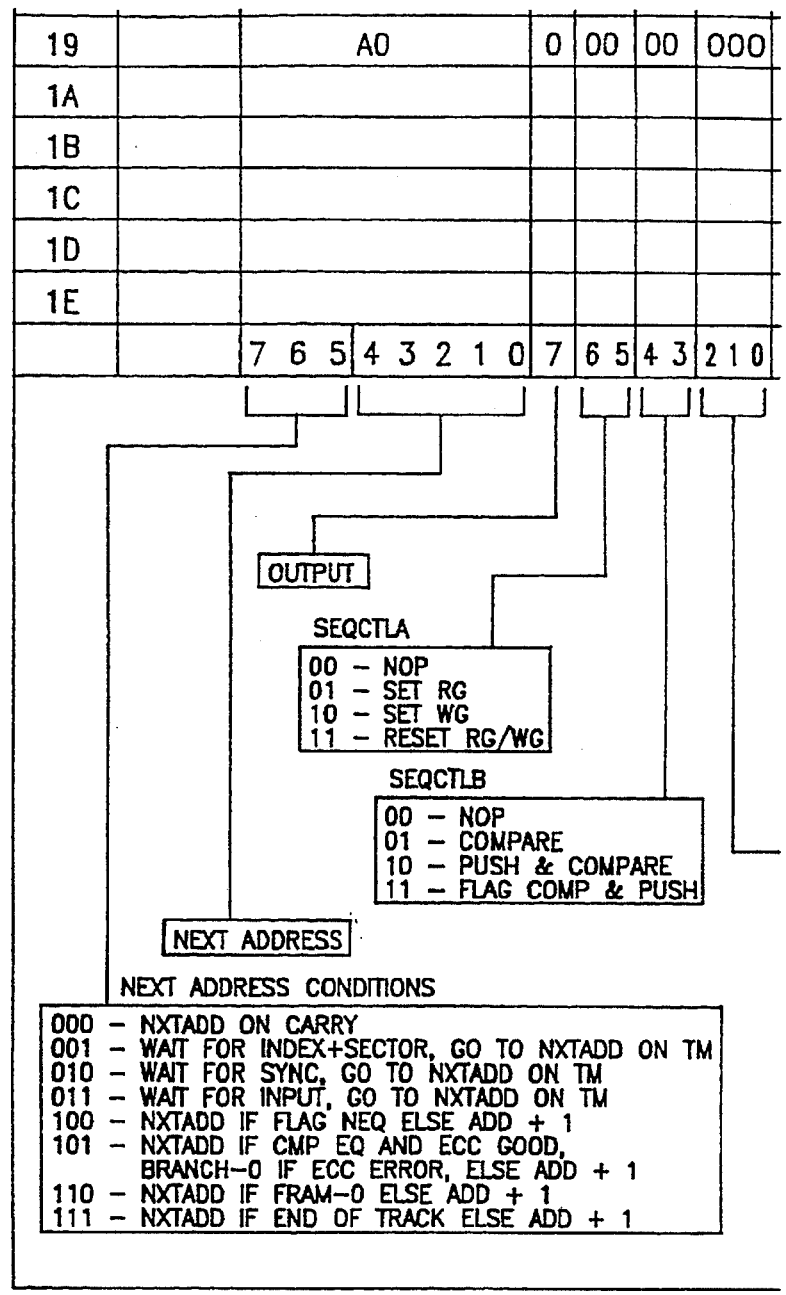
FIG. 14c    FRAM - CDR SOFT SECTORED FORMAT MAP

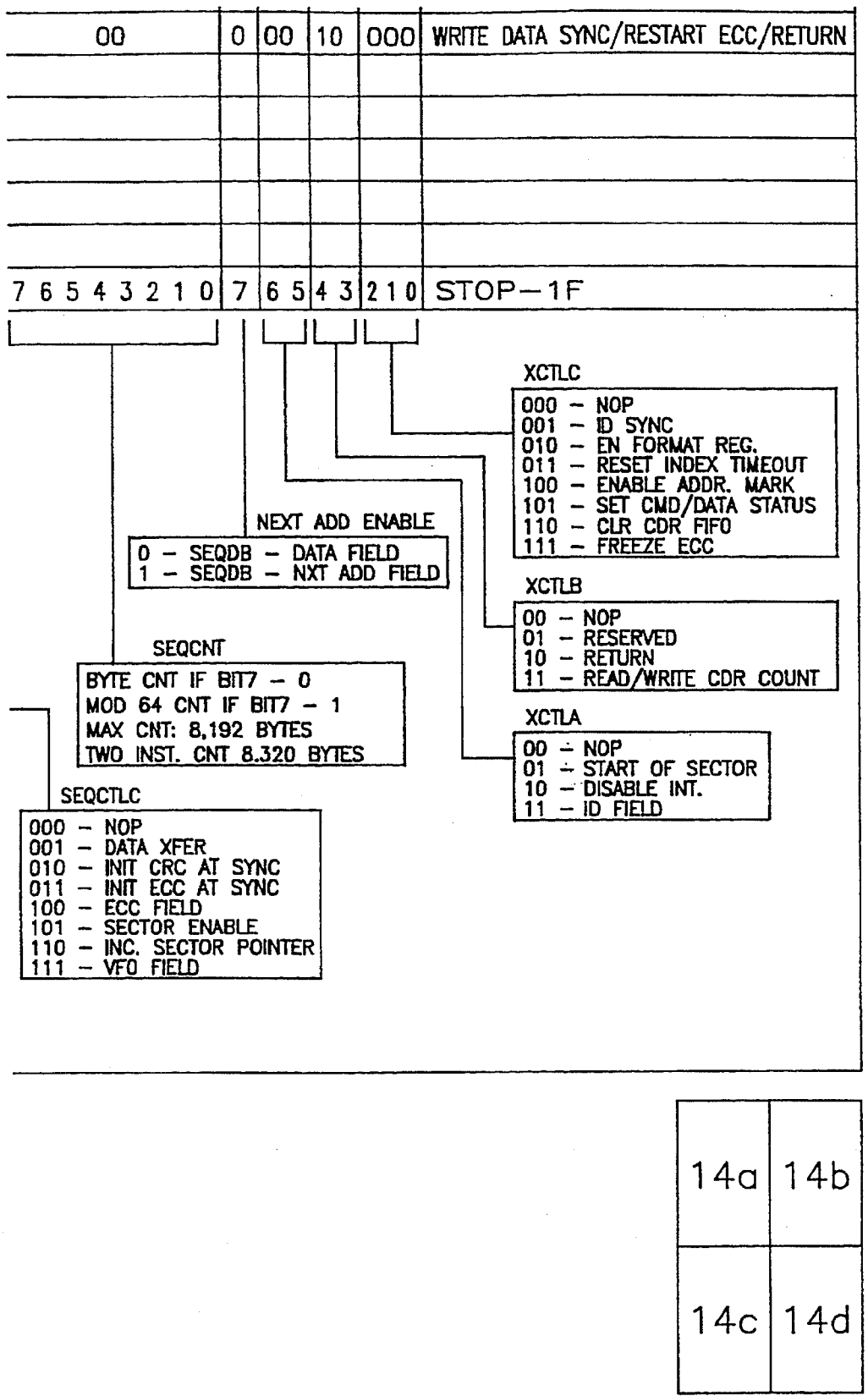
FIG. 14d    FRAM — CDR SOFT SECTORED FORMAT MAP

FIG. 15a  FRAM-CDR-SOFT SECTORED DISK SEQUENCER MAP

| SEQ ADDR | ADDR LABEL | SEQDB/NXTADD | | SEQCTL | | | |
|---|---|---|---|---|---|---|---|
| 00 | START | 001 | "START" | 0 | 00 | 00 | 000 |
| 01 | NEWFRAM | 000 | "STRID" | 0 | 00 | 00 | 000 |
| 02 | STRSEC | 001 | "STOP" | 0 | 00 | 00 | 000 |
| 03 | STRID | A0 | | 0 | 01 | 00 | 111 |
| 04 | | 010 | "STOP" | 0 | 00 | 00 | 010 |
| 05 | | CYLD-I | | 0 | 00 | 10 | 000 |
| 06 | | CYLD-II | | 0 | 00 | 10 | 000 |
| 07 | | HEAD | | 0 | 00 | 10 | 000 |
| 08 | | ------ | | 0 | 00 | 10 | 101 |
| 09 | | FLAG | | 0 | 00 | 11 | 000 |
| 0A | | 00 | | 0 | 00 | 00 | 000 |
| 0B | | 000 | "READ" | 0 | 00 | 00 | 100 |
| 0C | | 101 | "NXTID" | 0 | 11 | 00 | 000 |
| 0D | | 00 | | 0 | 10 | 00 | 111 |
| 0E | | A0 | | 0 | 00 | 00 | 011 |
| 0F | "READ2" | 00 | | 0 | 00 | 00 | 001 |
| 10 | | 000 | "ENDSEC" | 0 | 00 | 00 | 100 |
| 11 | | 00 | | 0 | 00 | 00 | 000 |
| 12 | ENDSEC | 111 | "STOP" | 0 | 11 | 00 | 000 |
| 13 | | 110 | "NEWFRAM" | 0 | 00 | 00 | 110 |
| 14 | | 000 | "STRSEC" | 0 | 00 | 00 | 000 |
| 15 | VECTOR2 | 00 | | 0 | 00 | 00 | 000 |
| 16 | VECTOR1 | 000 | "VECRD" | 0 | 11 | 00 | 000 |
| 17 | | 00 | | 0 | 10 | 00 | 000 |
| 18 | | A0 | | 0 | 00 | 00 | 000 |

FIG. 15b  FRAM-CDR-SOFT SECTORED DISK SEQUENCER MAP

| SEQCNT | XCTL | | | | COMMENT |
|---|---|---|---|---|---|
| FF | 1 | 00 | 00 | 100 | WAIT FOR INDEX + SECTOR/EN ADD MARK |
| SERVO GAP | 0 | 00 | 00 | 000 | STARTING SERVO |
| ISG | 1 | 00 | 00 | 100 | WAIT FOR AM/EN ADD MARK |
| 07 | 0 | 01 | 00 | 001 | SET RG FOR VFO/LOAD SYNC |
| 04 | 1 | 00 | 00 | 000 | WAIT FOR SYNC/START CRC |
| 00 | 0 | 00 | 00 | 000 | READ CYLD I/PUSH & COMP |
| 00 | 0 | 00 | 00 | 000 | READ CYLD II/PUSH & COMP |
| 00 | 0 | 00 | 00 | 000 | READ HEAD/PUSH & COMP |
| 00 | 0 | 00 | 00 | 000 | READ SECTOR/PUSH & COMP/EN SECTOR |
| 00 | 0 | 10 | 00 | 110 | READ FLAG/PUSH & FLAG COMP |
| 03 | 0 | 10 | 11 | 000 | READ CDR COUNTS/EN FIFO |
| 01 | W=0 R=1 | 10 | 00 | 000 | READ CRC BYTES |
| 00 | 1 | 10 | 00 | 000 | BRCH IDER+CRCER+NRM/NXT ID/RS RG |
| 0B | 0 | 10 | 00 | 011 | WRITE VFO FOR DATA/ SET WRITE GATE |
| 00 | 0 | 10 | 00 | 000 | WRITE DATA SYNC/START ECC |
| 87 – 512 | 0 | 00 | 00 | 000 | WRITE DATA |
| 0A | W=0 R=1 | 00 | 00 | 000 | WRITE ECC |
| 01 | 0 | 00 | 00 | 000 | WRITE TWO PAD BYTES |
| 00 | 1 | 00 | 00 | 000 | BRANCH ON SECTOR-STOP |
| 00 | 1 | 00 | 00 | 000 | CHECK FRAM/INC. SECTOR |
| 00 | 1 | 00 | 00 | 000 | BRANCH TO START OF SECTOR |
| 01 | 0 | 00 | 00 | 000 | WRITE VECTOR/WRITE TWO PAD BYTES |
| SERVO GAP | W=0 R=1 | 00 | 00 | 000 | READ VECTOR/RESET WG/JUMP GAP |
| 0B | 0 | 00 | 00 | 000 | WRITE VFO/ SET WG |
| 00 | 0 | 00 | 10 | 000 | WRITE DATA SYNC/RESTART ECC/RETURN |

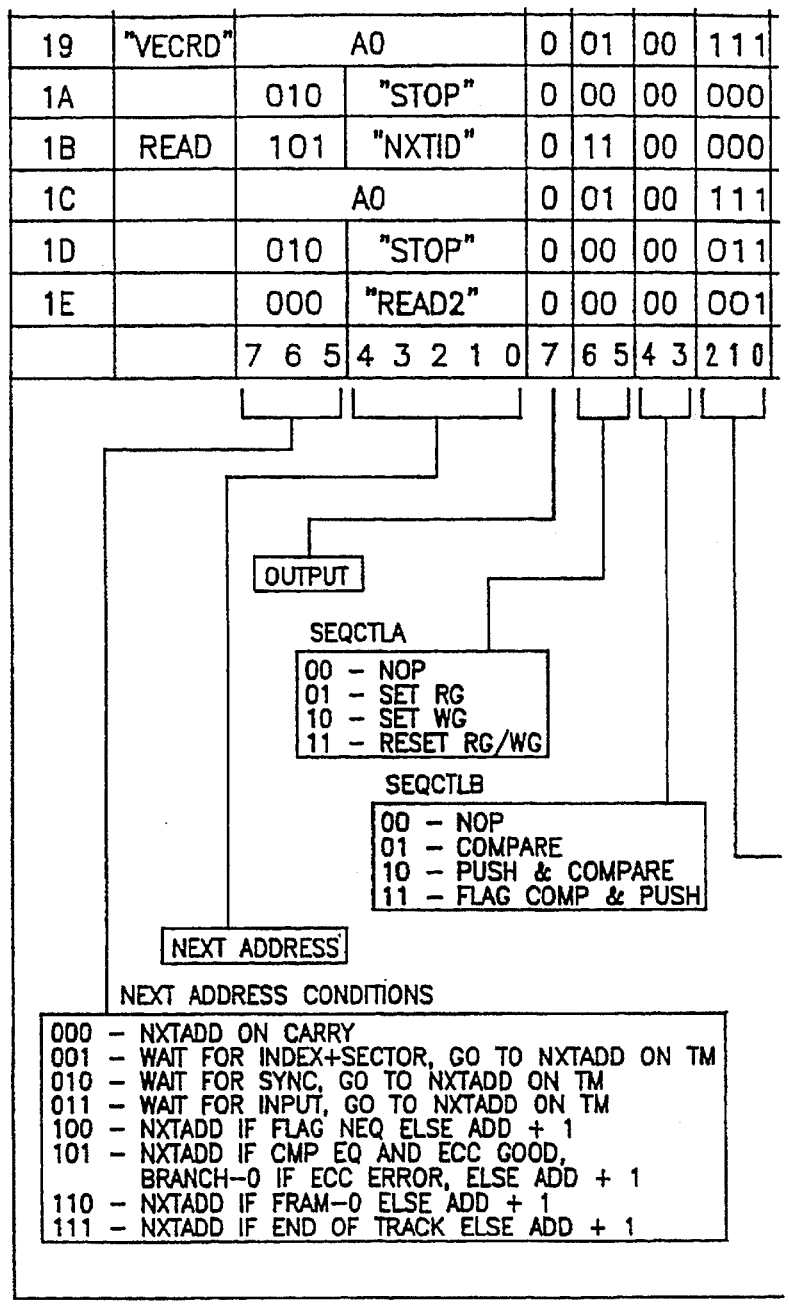
FIG. 15c   FRAM-CDR-SOFT SECTORED DISK SEQUENCER MAP

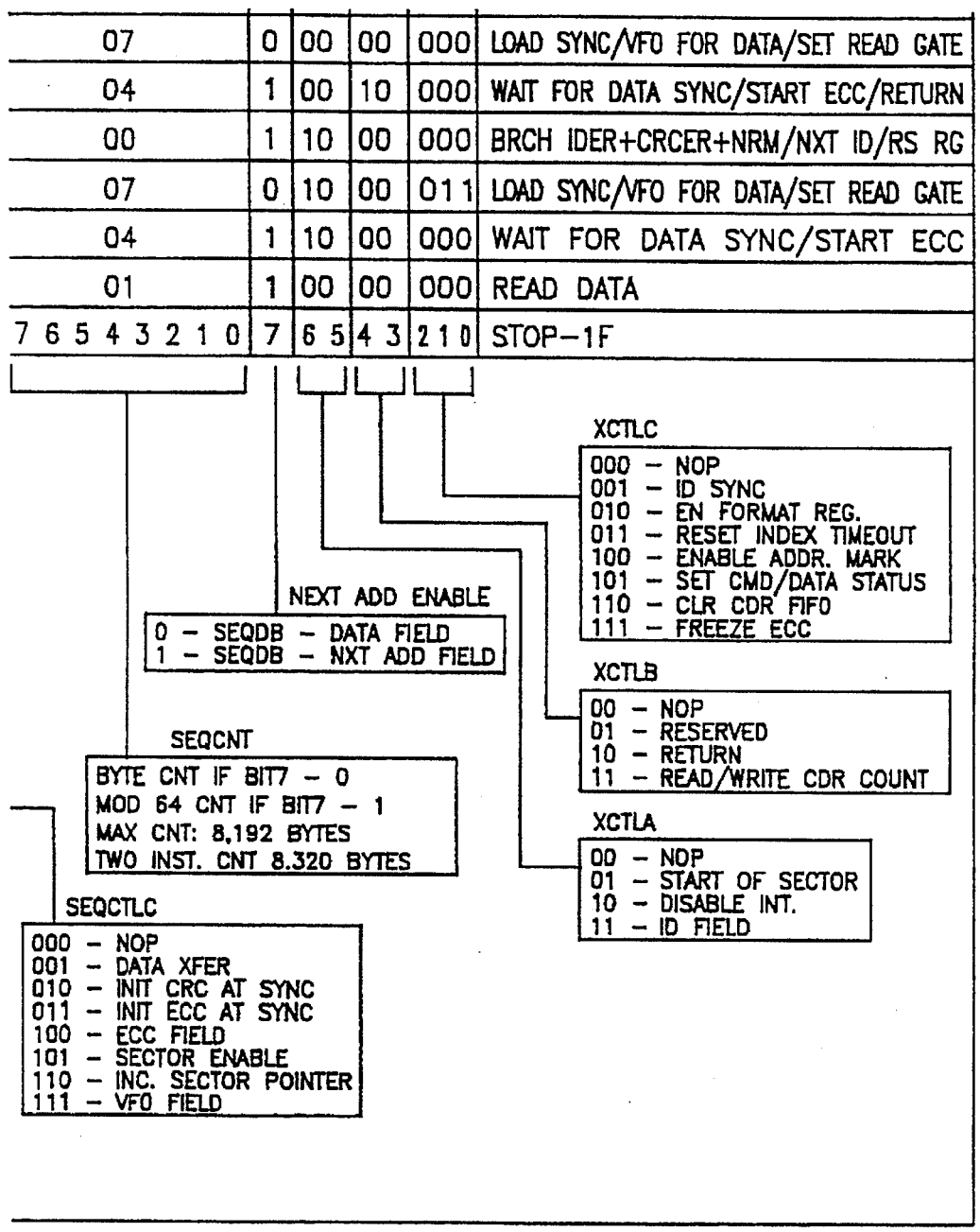
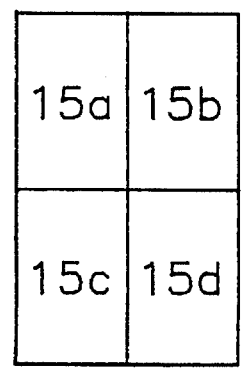
FIG. 15d  FRAM-CDR-SOFT SECTORED DISK SEQUENCER MAP

HARD DISK FORMAT USING FRAMES OF SECTORS TO OPTIMIZE LOCATION OF SERVO BURSTS

This application is a division of application Ser. No. 08/145,037, filed Oct. 28, 1993 which is a continuation of 07/704,568 filed May 17, 1991, now abandoned.

FIELD OF THE INVENTION

This invention relates to magnetic disk memory storage systems and, in particular, to a more efficient method and structure for processing data and embedded servo bursts contained on a magnetic hard disk.

BACKGROUND OF THE INVENTION

FIG. 1 shows a basic arrangement for interfacing a host computer 2 with a disk read/write mechanism 4. A microprocessor based disk controller 6, which includes a data storage buffer, is required for such an interface to accept read and write commands from host computer 2 via input/output bus 7 and to control disk read/write mechanism 4 via control lines 8 to read and write information from/to one or more rotating magnetic disks via information line 9.

Typically, a block of data to be written onto a rotating magnetic disk is first assigned a unique sector identification (ID) code by disk controller 6. The data is then written into a predetermined portion (i.e., sector) of the disk corresponding to that unique sector ID code. This ID code included in an ID code field of a particular sector thus acts as an address of that data and uniquely identifies the data's location on the disk.

When that data, previously given a file name by the user or by a software program, is to be later read from the disk upon a command by host computer 2, the ID code (or plurality of ID codes if the file requires a plurality of sectors) corresponding to the file name containing the desired data is identified by the disk controller using a memory means. The disk controller then uses the ID code to position a magnetic transducer, or head, over the particular track on the disk known to contain the sector having that ID code. When the head reads an ID code corresponding to the ID code of the desired data to be read, the disk controller then temporarily stores the desired data following the ID code in a buffer for eventual transmission to the main memory of host computer 2.

In addition to an ID code field and data field within each sector, other fields are contained within a sector to enable the accurate reading of the data. In addition, servo bursts are located in each track of the disk to precisely identify the head's position with respect to the center of a track.

FIG. 2 shows a representative one of a plurality of sectors 10 on a disk 12. Sector 10 is greatly enlarged for illustration purposes. There may be 32–64 sectors on a given track of a typical hard disk and as many as 1200 tracks on a single disk surface. Each sector on a disk typically begins with a preamble comprising a variable frequency oscillator (VFO) field 16 (also known as a phase lock oscillator field), having 8–12 bytes, and a synchronous (sync) field 18, having one byte. VFO field 16 and sync field 18 are typically not changed during the life of the disk. VFO field 16 contains a known code pattern, which is typically recorded by the manufacturer of the disk, so that the precise bit frequency of the information following VFO field 16 can be known prior to the information being read. This enables the information which follows VFO field 16 to be read from the disk at the proper read/write clock rate.

A sync field 18, having a known one byte bit pattern, follows VFO field 16 to align the byte boundaries of data following the sync field.

ID code field 22, having a number of bytes required to uniquely identify a single sector on disk 12, follows sync field 18. A unique ID code is assigned to each sector during the initial formatting of the disk and is typically not changed during the life of the disk.

As previously stated, during a read/write operation, the microprocessor based disk controller 6 in FIG. 1 assigns a sector ID code to the data to be stored in a particular sector 10 and retains this correlation in a memory means. A table containing the various correlations between stored data and ID codes may also be written into predetermined sectors of the disk for storage and retrieved by the disk controller during the start-up of the system.

When data is to be read from the disk, the disk controller cross-references the data file name with the particular ID code associated with that data and controls the disk read/write mechanism to read the data following that particular ID code. During a write operation, data is written into a data field of a particular sector by issuing a write command to disk read/write mechanism 4 in FIG. 1 soon after the particular sector has been identified by its ID code.

Following ID code field 22 is Cyclic Redundancy Check (CRC) field 23. The bits contained in CRC field 23 are the product of a CRC algorithm performed on the ID code. When the ID code is later read, a CRC algorithm is again performed on the ID code, and the newly generated CRC code is compared with the CRC code in CRC field 23. If the CRC codes are identical, the read ID code is presumed accurate.

Following CRC field 23 is a gap 24, which provides a needed delay for the disk controller to process the ID code and prepare for reading or writing the data from or to the sector.

Following gap 24 are VFO field 26 and sync field 28, similar in function to VFO and sync fields 16 and 18, respectively. VFO field 26 and sync field 28 are written every time data is written into sector 10 so that this timing information precisely corresponds to the bit rate and byte alignment of the data which follows. If gap 24 did not exist, only VFO field 16 and sync field 18 would be needed to precisely set the data read/write clock phase, clock frequency, and byte alignment.

Data field 30 follows sync field 28. Data field 30 typically totals 512 bytes and contains the information of interest to the user of host computer 2 in FIG. 1.

Error correction code (ECC) field 34 follows data field 30 and typically comprises up to 11 bytes. Error correction circuitry in the disk controller performs an error correction encoding algorithm on the data bits to be written into a sector and generates the ECC. The ECC is then written into ECC field 34. When the data is later read from the sector, the ECC is checked, and the accuracy of the data can then be determined. The ECC may be used to correct the data if necessary.

At intervals along the various tracks of the disk, servo bursts, such as servo burst 40 in FIG. 2, are recorded (typically by the manufacturer of the disk) to provide information to disk read/write mechanism 4 indicating when the read/write head is positioned directly over a track. Disk read/write mechanism 4 typically contains circuitry to process these servo bursts and properly align the position of the read/write head over the track. This processing of servo bursts is transparent to the disk controller. Disk controller 6 must, however, not confuse the servo bursts with other recorded information and must not attempt to write over a servo burst. Typically this servo burst 40 is 32 bytes long.

As an example, each servo burst may be a paired burst, A and B, positioned on opposite sides of a track. When the head detects that the amplitude of burst A does not equal that of burst B, the disk read/write mechanism adjusts the head position until the amplitudes of A and B are equal. In this way, the head is centered over the track. The particular information contained in a servo burst is irrelevant to this disclosure.

These servo bursts are written onto the various tracks by the disk manufacturer and read from the disk at either fixed time intervals or at intervals based on a physical distance around each track.

FIG. 3 shows servo bursts 40 being written onto the various tracks of a rotating disk at fixed time intervals. Since the intervals are fixed in time, there is more distance between servo bursts 40 around the outer tracks of the disk than around the inner tracks.

In the prior art, recorded sectors, such as sectors 44 and 48 in FIG. 3, are typically located so as not to intersect a servo burst.

In the example shown in FIG. 3, the technology used to write information in inner track sectors 44 and outer track sectors 48 is called Constant Density Recording (CDR), which causes bits to be written onto disk 12 so as to have a constant density whether written onto the inner tracks or the outer tracks. This greatly increases the bit capacity of a disk. However, to achieve CDR, the read/write clocking of data must be faster when reading from or writing to the outer tracks than when reading from or writing to the inner tracks due to the increased speed of the recording medium under the head towards the outer periphery of the rotating disk. As a result, by using CDR, all sectors will be the same physical length whether on the inner tracks or the outer tracks.

As seen from FIG. 3, more sectors may be located between servo bursts 40 in the outer tracks than between servo bursts 40 in the inner tracks.

When not using CDR, but instead using a fixed frequency read/write clock, typically the servo bursts around each track are located at time intervals corresponding to the start of each sector. Thus, for example, there would be one sector between each servo burst irrespective of whether the sector was located on an inner track or an outer track. Using non-CDR technology, sectors would be physically longer on the outer tracks than on the inner tracks, since the speed of the recording medium under the head is faster towards the periphery of the disk.

Another spacing interval for servo bursts when recording data using CDR technology is shown in FIG. 4 and is based on inserting a servo burst 52 at fixed spacings or fixed bit intervals around each track. As seen, each track may have associated with it a different number of servo bursts 52 or a different fixed spacing between servo bursts to allow the sectors 56 to be more optimally spaced around each track.

In the fixed time interval servo bursts illustrated in FIG. 3, the disk controller, such as disk controller 6 in FIG. 1, when reading or writing data from or to a sector, determines when a servo burst will occur (and thus when to skip over the servo burst) based on the number of counts of the fixed frequency disk clock.

In the variable time or bit interval servo bursts illustrated in FIG. 4, the read/write clock pulses may be counted to identify when a servo burst will occur. Since a certain servo burst interval may be associated with each track, a look-up table may be used by the disk controller to determine the clock count between servo bursts for each track.

The invention disclosed herein primarily relates to a method of handling servo bursts when they may occur anywhere on a track, including within virtually any field of a sector. Additional background information is presented to further appreciate the need for this method.

Prior art disk controllers provide very little flexibility in the arrangement of servo bursts on a disk, since the prior art disk controllers do not have the capability of detecting servo bursts occurring anywhere within a data field of a sector or anywhere within the other fields of a sector. Thus, the manufacturers of hard disk drive mechanisms typically locate the servo bursts in a track at a same location in each sector of the track (e.g., at byte X in the data field) or so as not to even occur in a sector. Thus, the predetermined location of the servo bursts in each track may be simply fixed in a memory means within the disk controller.

Thus, the prior art offers limited flexibility in arranging the various sectors in relation to the servo bursts. This results in a less than optimum sector arrangement on the disk, and a relatively large amount of disk area is wasted.

To Applicant's knowledge, no prior art disk controller exists which enables servo bursts and sectors to be arranged such that a servo burst may occur virtually anywhere within virtually any field of a sector.

Thus, what is needed in the field of disk drive controllers is a method of identifying and processing servo bursts occurring at different positions within sectors without unduly increasing the complexity of the disk controller.

SUMMARY OF THE INVENTION

A novel disk controller and method of operating said disk controller is disclosed which provides a highly efficient means of interrupting a data field for skipping over a servo burst located anywhere within the data field and then reading the remainder of the data field. The servo burst may be located at a different location in the data fields of successive sectors.

The invention also encompasses methods to skip over servo bursts occurring in virtually any field of a sector without losing information within that field. Thus, this novel structure and method allows virtually any information field in a sector to be split by a servo burst. Several methods of determining when a field will be split by a servo burst are also disclosed.

In the preferred embodiment, the servo skipping operation is controlled by microcode in the disk controller's sequencer RAM, and the servo skipping operation is initiated by a servo interrupt signal. The servo interrupt signal is generated by the disk controller when a servo burst is to occur. This servo interrupt signal may be generated at fixed time intervals, using a count from a disk clock, or by counting the bytes in a sector leading to the servo burst. The number of bytes leading to the servo burst may vary, and, in one embodiment, the number of bytes before the servo burst occurs within a sector is contained in the ID field for that sector. In another embodiment, the predetermined number of bytes before a servo burst occurs is stored in memory within the disk controller.

When the servo interrupt signal occurs, the normal flow of the disk controller microcode program is interrupted, and control of the disk controller is transferred to one of three servo interrupt handling routines which reside within the microcode. Each servo interrupt routine performs the steps necessary for skipping over the servo burst and causing the microcode to return to an appropriate instruction in the microcode. The factors that determine which of the three servo interrupt routines is to be executed are the type of field which the disk controller is executing (ECC, DATA, ID, GAP, etc.) and whether that field is being read or written. This allows the user to program different responses to the servo interrupt based on the current field type and the current operation.

To carry out one of the three servo interrupt handling routines, the base address of each servo interrupt routine is loaded into a respective vector address register within the disk controller. Upon generation of the servo interrupt signal, the disk controller will choose which interrupt vector (i.e., base address of interrupt routine) to use depending on the current disk controller activity.

Before the disk controller branches to a servo interrupt routine, it saves the microcode address to which it must return after the servo interrupt routine is completed. The possible choices for the return address are either the address that is currently being executed or the current address plus one.

Additional features of the invention include combining certain fields of the sequencer map, which results in a combined sequencer data and next-instruction field, wherein the next-instruction is a branch instruction identified in the field by a next-address. If a specified condition is met, the sequencer branches to the next-instruction. This feature is further summarized below.

A sequencer address counter is used in the disk controller to control the flow of the sequencer map. For normal instructions, the sequencer address counter simply increments to address the current-address-plus-one for execution. The sequencer address counter can also be loaded with the address in a next-instruction field in the sequencer map or by a vector address in a vector address register. Controlling the loading and incrementing of the sequencer address counter is handled by the sequencer. An option bit in the sequencer map enables certain logic to decide if the next-instruction field will be loaded into the address counter or whether the address counter will simply increment by one based on whether specified conditions dictated by the sequencer map are met.

Since many next instructions are the current-address-plus-one, the next-instruction field is not always needed. Thus, the next-instruction field can alternatively contain other information to be acted upon by the disk controller, such as a byte of information to be compared with a byte of information just read. When the option bit is not set, the combined data/next-instruction field is loaded with this sequencer data, and the sequencer address counter is automatically incremented by one.

For instructions where sequencer data, such as sector ID information, is loaded in the data/next-instruction field, a separate sequencer data register is also loaded with the contents of the data/next-instruction field. The contents of the sequencer data register are saved during any subsequent instructions with the option bit set. In this way, the register can be loaded with a value to be used later, if desired, during a next instruction.

Provided with the above-described flexibility of a disk controller in handling servo bursts, additional flexibility in formatting disks is also obtained.

In one example of increased flexibility in formatting a disk, a sequence of different sector types, wherein each sector type contains either no servo burst or one or more servo bursts, may be grouped together as a frame and repeated as a frame around a certain track. Thus, an optimal combination of sector types may be grouped together on each track to optimize the intervals between servo bursts and to provide the greatest amount of information on a track. Each frame may then be treated as a single unit by the disk controller.

The logic to read from and write to these frames is implemented using a register, a counter, the disk controller sequencer state machine, and miscellaneous control logic. The register is loaded by firmware with the number of sectors contained in a frame on a particular track being read. The miscellaneous control logic loads the counter with the contents of the register and will reload the counter any time the count reaches zero. The counter is decremented by the sequencer state machine as appropriate during the reading of a frame. The count is tested for zero in accordance with an instruction from the sequencer. In this way, the sequencer can determine when it is at the end of the frame. Each sector within the frame is processed according to whether or not the sector contains a servo burst.

Thus, as seen, a number of advantages are obtained by the increased flexibility of providing a disk controller capable of identifying and processing servo bursts occurring at variable positions within sectors on a disk.

BRIEF DESCRIPTION OF THE DRAWINGS

FIGS. 6a1, 6a2, 6b, 6c, 6d and 6e are flowcharts illustrating the handling of servo bursts occurring in any field of a sector.

FIGS. 7a, 7b, 7c and 7d shows a sample sequencer map which can be loaded into the disk controller.

FIGS. 9a, 9b, 9c, 9d, 10a, 10b, 10c, 10d, 11a, 11b, 11c and 11d are sample sequencer maps for various applications of the disk controller.

FIGS. 14a, 14b, 14c, 14d, 15a, 15b, 15c and 15e are sample sequencer maps for the disk controller when frames are to be used to store information on a disk.

DETAILED DESCRIPTION OF THE PREFERRED EMBODIMENT

Described herein is a preferred embodiment of the invention. The invention is a novel method and structure for handling servo burst interruptions in a data field or other field in a sector of a magnetic disk in order to read and process the one or more servo bursts located within the sector. Numerous other embodiments of the invention described herein will be obvious to those of ordinary skill in the art and are enabled by the following disclosure.

Various other improvements to prior art disk controllers and to the arrangement of information stored on a magnetic disk are also discussed herein and are enabled by the above-mentioned advancement in handling servo bursts.

DESCRIPTION OF DISK CONTROLLER STRUCTURE

Figure 5A:
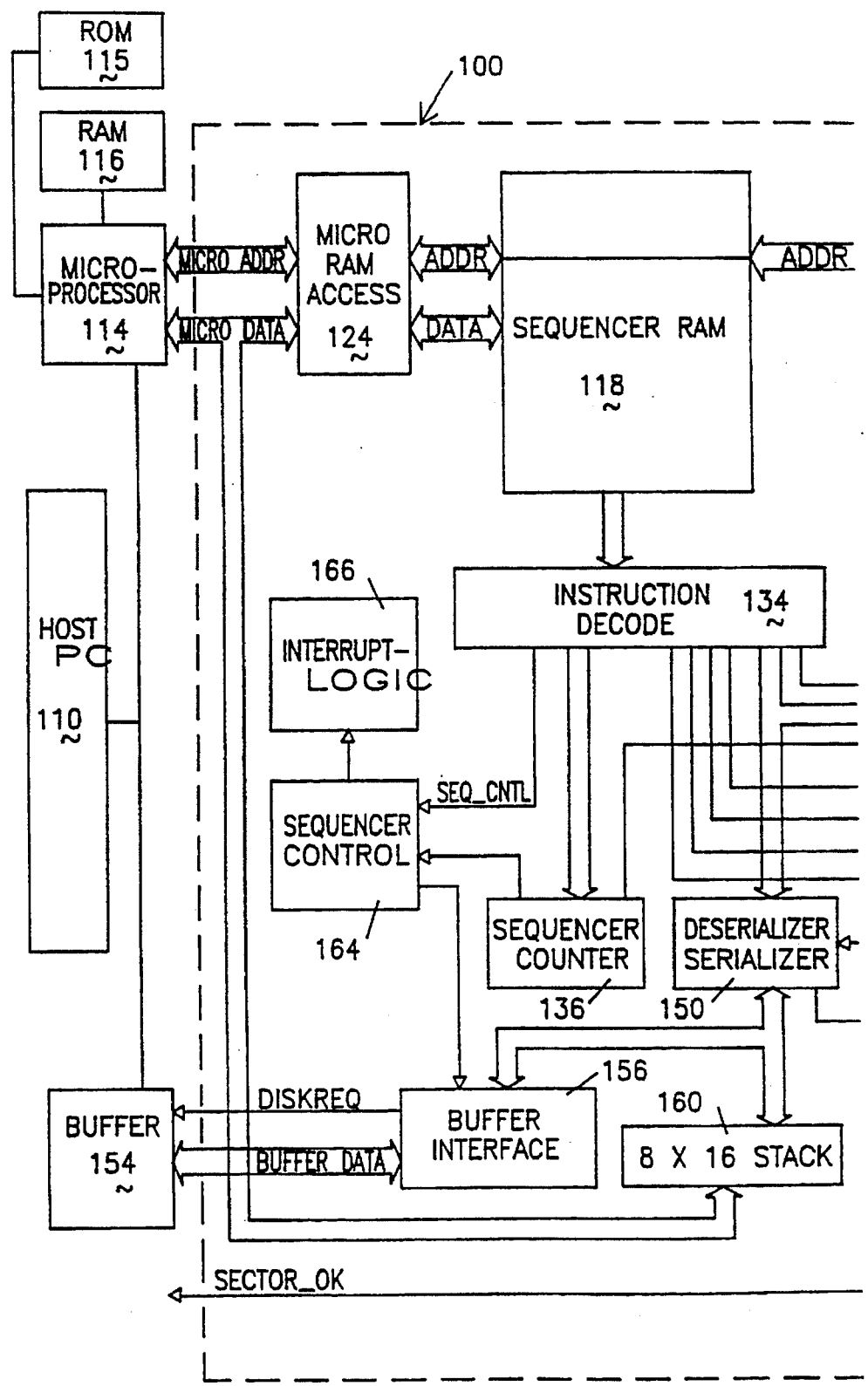
FIGS. 5a and 5b illustrate a disk controller and its interfaces in accordance with a preferred embodiment of the invention.
Figure 5B:
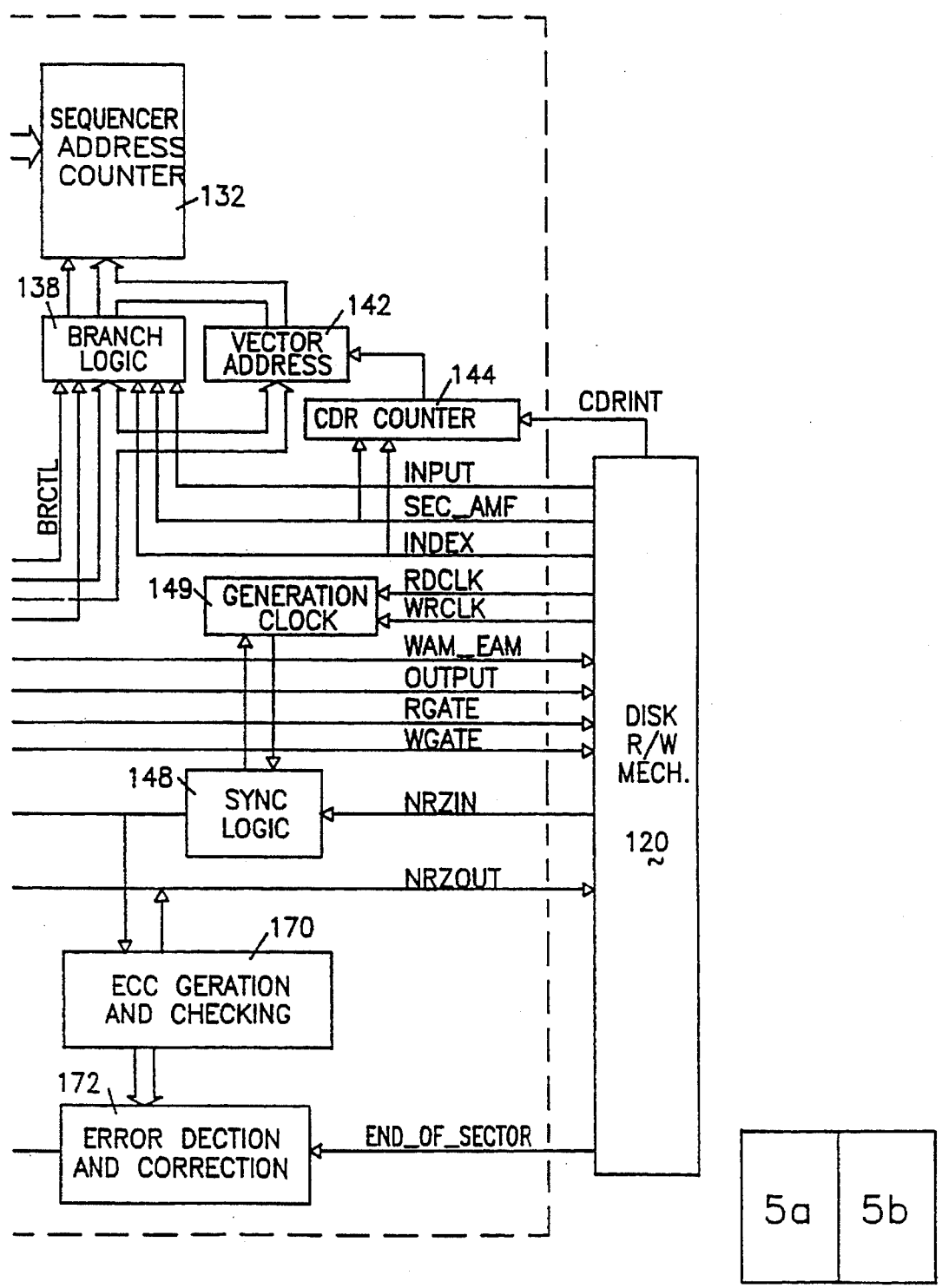

FIG. 5 illustrates a disk controller 100 and its interfaces with certain related external circuitry in accordance with a preferred embodiment of the invention. Only those elements within disk controller 100 relating to the invention described herein are shown. Elements of the disk controller which are not shown may be similar to elements in well known disk controllers.

Host computer 110, which may be a personal computer housing all components shown in FIG. 5, initially instructs a disk controller microprocessor 114 to commence a disk reading or writing operation. Microprocessor 114 may be located internal to disk controller 100 or external to disk controller 100, as shown in FIG. 5. Operating instructions for microprocessor 114 may be contained in ROM 115.

If data provided by host computer 110 is to be written to a disk, microprocessor 114 assigns the data file one or more available sector ID codes, the number of sectors needed being dependent on the amount of data to be written. The sector ID(s) assigned to the data file is then stored in DRAM or SRAM 116 internal or external to disk controller 100, or stored on a predetermined portion of the disk itself. The particular head and cylinder (i.e., track) which must be used to access a particular sector is determined, in the preferred embodiment, by firmware internal or external to disk controller 100 in conjunction with microprocessor 114.

Data identified by host computer 110 to be read from the disk is cross-referenced by microprocessor 114 to identify the sector ID which contains the desired data. The firmware then identifies the particular head and cylinder which can access the particular sector containing the stored data.

To now read or write this data from or to the disk, microprocessor 114 then loads the required microcode instructions into sequencer 118 to read or write data into one or more of the identified sectors of a disk housed in disk read/write (R/W) mechanism 120. FIG. 7 illustrates one set of instructions (i.e., a sequencer map) which may be loaded into sequencer 118 for a CDR-soft sectored type disk. In the preferred embodiment, sequencer 118 contains 32 separately addressable instructions (address 32 being a standby mode), each 32 bits in length.

The sequencer map is loaded into sequencer 118 using microprocessor/RAM interface 124, which controls sequencer to store the data outputted by microprocessor 114 in the proper address locations.

Thereafter, sequencer 118 executes sequentially through the sequencer map, instruction by instruction, unless the sequence is broken by one of the following five types of instructions or events to be discussed in more detail later:

1) A wait instruction is used to synchronize disk controller 100 to read or write, as appropriate, index marks, sector marks, sync byte(s), or any other information on the disk. This instruction waits for either a specified condition in the sequencer map to be met or for a time-out. The sequencer 118 will jump to the address in a next-address field on time-out or go to the current-address-plus-one, depending on if the specified condition is met.

2) A branch instruction is used where a condition is specified in the sequencer map. If the condition is met at the time when a sequencer byte counter indicates all bytes in the particular field of interest have been counted, sequencer 118 will jump to the address in the next-address field, otherwise it will go to the current-address-plus-one at the time sequencer counter 136 underflows (i.e., reaches zero).

3) Sequencer 118 can be programmed to stop (i.e., be placed in a standby mode) at the appropriate time when specified events occur.

4) Sequencer 118 can be programmed to jump to an address contained in one of three vector interrupt registers. These connectional vectors (addresses) are selected based on whether the disk controller is operating on an ID field, a data transfer, an ECC field, a VFO, a sync, or a gap and whether data is being read or written. A connectional vector occurs if it is indicated by any one of a variety of means, such as CDR counter 144, that a servo burst is about to occur.

5) A return instruction is used to restart an interrupted operation. A return address register within sequencer address counter 132 stores the return address. A return instruction will conditionally restore the saved sequencer byte count field and restart the ECC logic.

The count of sequencer address counter 132 determines which instruction contained in sequencer 118 is to be acted upon by disk controller 100.

Instruction decode circuitry 134 decodes the instructions outputted by sequencer 118 and controls the appropriate circuitry to carry out the addressed instruction.

Sequencer counter 136 is loaded by instruction decode circuitry 134 with the number of bytes of information for which the present instruction is to be carried out. When sequencer counter 136 counts down to zero, a signal is generated to indicate that a next instruction is to be initiated. It is to be noted that, for simplicity, not all connections between the various functional blocks in FIG. 5 are shown; however, these connections will be apparent to those of ordinary skill in the art.

Branch logic circuitry 138 accepts inputs from instruction decode circuitry 134, sequencer counter 136, and from disk R/W mechanism 120 and determines a next address based on a condition being met.

Vector address circuitry 142 is loaded with three vector addresses for handling a servo interrupt and receives a signal from CDR counter 144 that a servo burst is to occur on a particular disk track being read or written onto. The vector addresses are loaded by microprocessor 114 at the time the sequencer map is loaded into sequencer 118. Vector address circuitry 142 then determines the proper address in sequencer 118 to which to vector so as to skip over the servo burst without losing any information. A signal from instruction decode circuitry 134 identifies to vector address circuitry 142 the proper one of the three vector addresses to load into sequencer address counter 132 in the event a servo burst is about to occur.

CDR counter 144 is loaded with a byte count from a suitable source, such as from the ID field in each sector on the disk, which indicates the number of bytes in the sector before a servo burst will occur. As sequencer 118 controls disk read/write mechanism 120 to read an ID field and a CDR count from a disk, the CDR count, identifying the servo count code, is loaded into a four byte CDR FIFO, contained in functional block 144, labeled CDR counter, in FIG. 5. The first two bytes are loaded into a separate 16-bit servo counter within CDR counter 144. The value that is loaded into the 16-bit servo counter is the number of bytes from the data field sync byte to the servo burst. Since the data field is typically 512 bytes long, only two bytes are necessary to store the number of bytes from the data field sync byte to the servo burst. Therefore, counts for up to two servo bursts can actually be loaded into the four byte CDR FIFO within CDR counter 144 from each ID field. As the bytes within the sector are counted by sequencer counter 136, the 16-bit servo counter is decremented. When this first count is exhausted, a servo interrupt signal will be generated, and the 16 bit servo counter within CDR counter 144 will be loaded with a second count from the four byte CDR FIFO, which may or may not exist. When the count in CDR counter 144 reaches zero, sequencer address counter 132 is loaded with the proper vector address so that sequencer 118 will control disk controller 100 to skip over the servo burst. In the preferred embodiment, the 16-bit servo counter within CDR counter 144, which may have more or less capacity as needed, is independent and dedicated. In other words, it is not used for any other purpose than to count bytes leading to a servo burst. This is desirable since CDR counter 144 contains counts totally-independent of the sequencer counter 136, which counts the number of bytes processed during each instruction to determine when the instruction task is complete.

The count contained in independent CDR counter 144 may be loaded with a different count for each sector from an ID code or may be loaded with a different count for each track by a memory means in disk controller 100. The count may also be a fixed clock count if the servo bursts are separated by fixed time intervals. The count would then be decremented in accordance with the fixed frequency disk clock. However, this disk clock is located in disk read/write mechanism 120 and may be difficult to access and not be in sync with the location of the servo burst.

When the count in CDR counter 144 reaches zero, it causes the servo interrupt signal to be generated, as previously discussed.

As an alternative to CDR counter 144, the disk read/write mechanism 120 may actually contain a counter for detecting the revolution of the disk itself to indicate when a servo burst is coming up. In this case, the disk read/write mechanism 120 may simply provide a CDR interrupt signal (such as CDR INT in FIG. 5) for causing vector address circuitry 142 to properly skip over the servo burst. Such a CDR INT signal may be directly applied to vector address circuitry 142 or to CDR counter 144.

Raw data from the disk R/W mechanism 120 is applied to an input of sync logic circuitry 148, which synchronizes the read/write clocking generated by clock generation circuitry 150.

The data read from or to be written to the disk is processed by deserializer/serializer circuitry 150 to place the non-return-to-zero (NRZ) incoming data into the appropriate voltage levels for processing by disk controller 100, or vice versa in the case of a writing operation.

Figure 1:
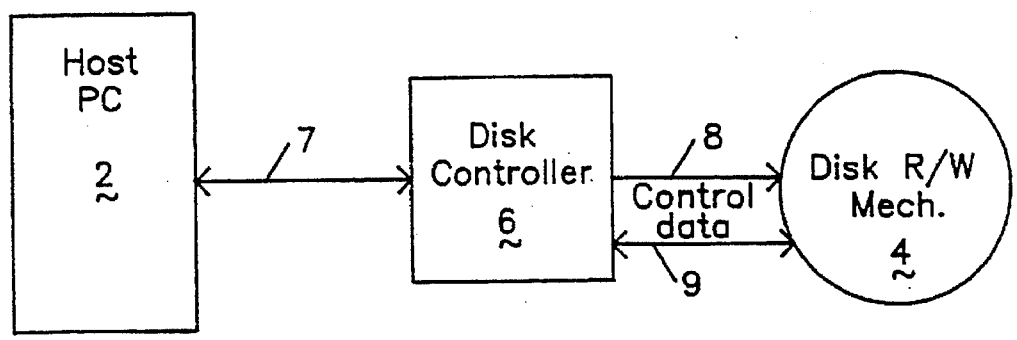
FIG. 1 illustrates the interfacing of a host computer with a disk read/write mechanism.
Figure 2:
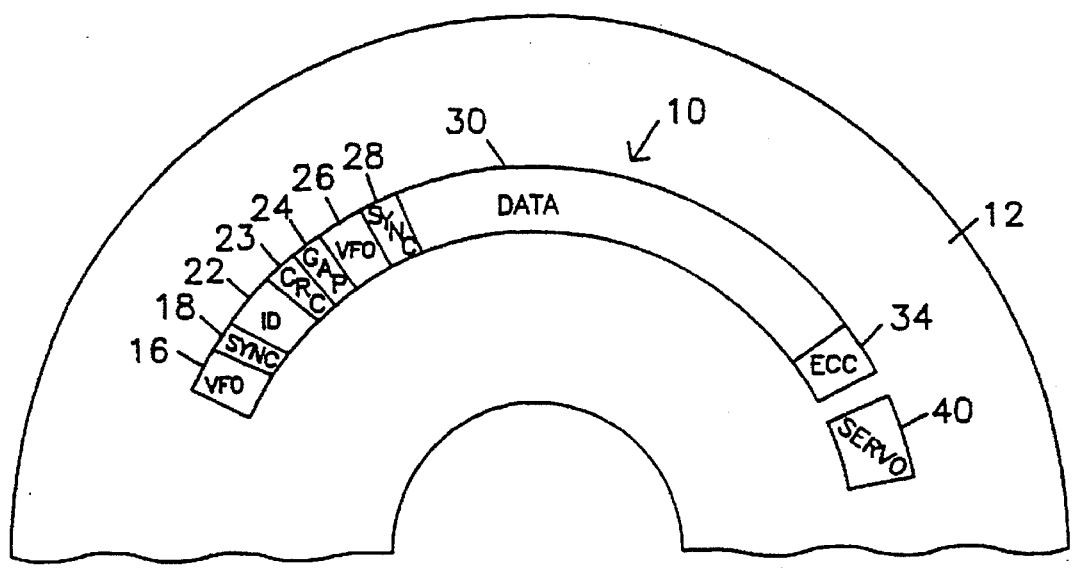
FIG. 2 illustrates a typical sector on a magnetic disk surface.
Figure 3:
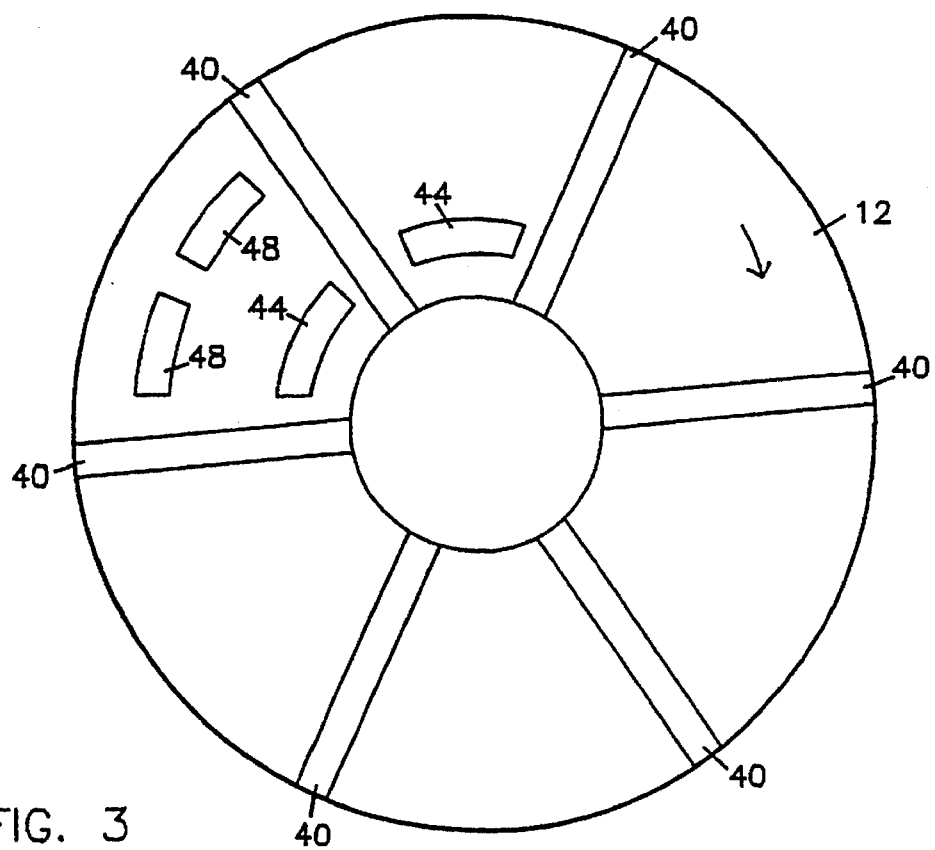
FIG. 3 illustrates servo bursts on a disk surface at fixed time intervals.
Figure 4:
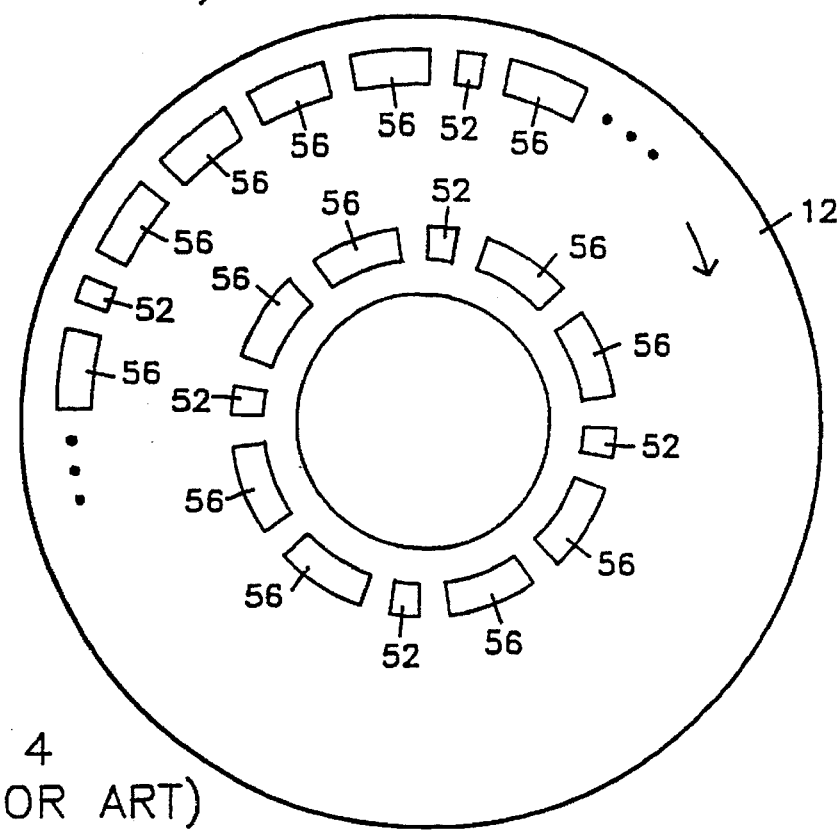
FIG. 4 illustrates servo bursts on a disk surface at intervals selectable for each track.

In the case of reading data from a disk, such as data contained in data field 30 in FIG. 2, the deserialized data within a designated sector is directly transferred from deserializer/serializer circuitry 150 to data buffer 154 via data buffer interface 156. Host computer 110 may then access the requested data in buffer 154. When data is to be written onto a disk, the data is first loaded into buffer 154 by host computer 110.

For reading a sector ID code, such as the ID code contained in ID field 22 in FIG. 2, and determining whether the read sector ID code matches a designated ID code containing the desired data, the read ID code is compared with an ID code previously loaded into sequencer 118 which is known to contain the desired data and loaded into stack register 160. If there is a match, then the data which follows the ID code is stored in buffer 154 for being accessed by host computer 110.

Sequencer control circuitry 164 processes control instructions from instruction decode circuitry 134 and identifies whether a condition has been met, such as an ID code match, buffer interface 156 is ready, buffer 154 has available storage room, or if there is a CRC error. When the condition has been met, the appropriate actions are taken, such as enabling data buffer interface 156 for loading data into buffer 154, or causing interrupt logic 166 to perform an appropriate function upon the occurrence of a CRC error.

ECC generation and checking circuitry 170 performs ECC operations on the incoming and outgoing data. Error detection and correction circuitry 172 performs the appropriate correction on the data if necessary and signals whether the received data is accurate.

The circuitry of FIG. 5 has been described herein to facilitate the understanding of the flowcharts of FIGS. 6a–6e and is not intended to limit the invention. Numerous other circuits for carrying out the flowcharts of FIGS. 6a–6e will become apparent to those of ordinary skill in the art.

Operation of Circuitry of FIG. 5

The flowcharts of FIGS. 6a–6e illustrate one embodiment of a set of instructions programmed into sequencer 118 to read and write data in CDR technology.

The flowchart of FIG. 6a includes branch instructions which cause the flowchart to branch to vectors 0, 1, or 2, depending on where a servo burst occurs in a sector and whether the disk is being written upon or read from during the occurrence of this servo burst.

As previously discussed, servo bursts are written onto the disk around the various tracks during the initial formatting of the disk to enable the precise centering of the head over the track. In the present invention, while disk controller 100 is reading from or writing to the disk, a servo interrupt signal is generated in a number of ways to indicate that the sector will be interrupted by a servo burst and that various steps must be taken to skip over the servo burst so as not to affect the ECC.

This servo interrupt signal may be generated by counting the fixed frequency disk clock pulses, if the servo bursts are written around the tracks at fixed time intervals. The servo interrupt signal may also be generated using a memory means, such as a RAM internal or external to disk controller 100, which identifies the number of bytes in a sector before the servo burst occurs. Additionally, this servo interrupt signal may be generated using information within the ID field or another field of a sector which identifies the number of bytes before the servo burst occurs. This information is written into the ID field during the initial formatting of the disk. The number of bytes before a servo burst occurs are then load into a 16-bit CDR counter 144 in FIG. 5, and CDR counter 144 decrements one for every eight pulses of the read/write clock. When CDR counter 144 reaches zero, this effectively provides the servo interrupt signal.

As previously indicated, an important feature of the disk controller described herein is its enhanced capability in handling the servo bursts within various locations in a sector. In order to accommodate embedded servo bursts, especially in CDR format, sequencer 118 has to be able to stop executing an instruction and jump to a routine to handle the servo gap while the servo burst is being processed elsewhere.

In disk controller 100 described herein, sequencer 118 will stop its current task, such as reading or writing data, and jump to an interrupt routine when it receives the servo interrupt signal. The above-mentioned interrupt routine is accomplished with an interrupt type vector addressing scheme, which is described below.

A different interrupt routine may be needed depending upon in which field the servo bursts occurs, and whether a servo burst occurs during reading or writing information from or to a sector, as described with respect to the flowcharts of FIG. 6.

When the servo burst occurs, disk controller 100 operates based on the instructions contained in the sequencer map addressed by the vector address registers 142.

Figure 8:
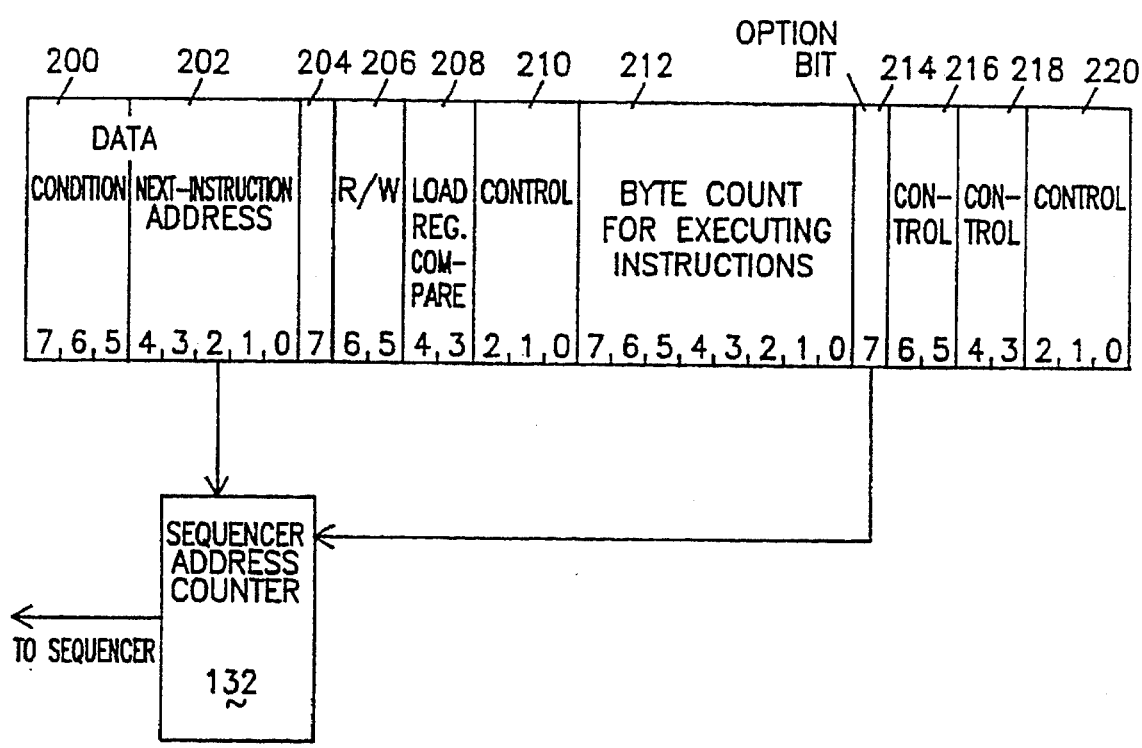
FIG. 8 illustrates the various fields within the sequencer map of FIG. 7.

There is a code in the map's extended control field 216, shown in FIG. 8, to disable the vector interrupts. This can be used to bridge areas where it is harmful to be interrupted, such as when sequencer 118 is waiting for an index mark. The vector interrupts will automatically be disabled when the sequencer is in its stopped, or standby, mode.

In step 1 of FIG. 6a, disk controller 100 of FIG. 5 is enabled, and sequencer 118 is loaded with the proper instructions including the desired ID code.

In step 2, sequencer 118 instructs disk controller 100 to wait for either an index mark on the disk (to indicate the beginning of a track) or a next sector on the track if the index mark for that track has already been read.

In step 3, once the index or the next sector, as appropriate, has been read, an inter-sector gap (ISG) must be jumped over. The ISG provides a time delay for the disk controller to set a read gate within disk R/W mechanism 120 for reading the sector. If a servo interrupt signal is generated during step 3, sequencer 118 branches to a vector 0, by means of vector address circuitry 142, to reset the read gate (RG) in disk drive mechanism 120 to prevent the servo information from entering the disk controller as information. Since the length of the servo burst is known, the branch instruction is returned to the jump ISG instruction of step 3 after the servo burst is completed. This is shown in FIG. 6b.

In step 4, the read gate is again set to enable information from the disk to be read by disk controller 100. The VFO and sync bytes are then read and appropriately processed. A layout of the various fields on a disk is generally shown in FIG. 2, which merely provides an example of the arrangements of the various fields in a sector. If a servo interrupt signal is generated during step 4, sequencer 118 is branched to vector 1 (shown in FIG. 6c), which includes the steps of: freezing the ECC/CRC, resetting the read gate, and jumping the servo burst; setting the read gate to read the VFO; reading the sync bytes and starting the ECC or CRC, as appropriate, depending upon whether an ID field or a data field is next to be read; and returning to either the same instruction that was interrupted by the servo interrupt signal or to a next instruction. The instruction to be returned to is determined by the Return routine shown in FIG. 6e.

The Return routine of FIG. 6e is the same for vectors 1 and 2. If it is identified in step 1 of FIG. 6e that a sync field (step 4) was being read at the time of the servo interrupt, there is no need to perform step 4 of FIG. 6a since vector 1 already performed a sync step. Accordingly, the sequencer address counter 132 program count is incremented by one (step 2 of FIG. 6e), and the sequencer counter 136 is loaded with a new count (step 3 of FIG. 6e) by sequencer 118.

If it is identified in step 4 of FIG. 6e that a VFO field was being read in step 4 of FIG. 6a during the servo burst interrupt, then step 4 of FIG. 6a will be repeated. Thus, sequencer address counter 132 will retain the same count (step 5 of FIG. 6e), and sequencer counter 136 will be reloaded with a new count (step 6 of FIG. 6e) by sequencer 118.

If it is identified in step 7 of FIG. 6e that neither the sync field or VFO field has yet been read in step 4 of FIG. 6a, and that the count of sequencer counter 136 is not zero, then both sequencer address counter 132 and sequencer counter 136 will retain their counts (steps 8 and 9 of FIG. 6e) so that step 4 of FIG. 6a will be carried out. If it is identified in step 7 of FIG. 6e that the count of sequencer counter 136 is zero, then sequencer address counter 132 will be incremented by one (step 2 in FIG. 6e), and a new count will be loaded into sequencer counter 136 (step 3 in FIG. 6e).

The following steps refer now to FIG. 6a.

In step 5 of FIG. 6a, CRC circuitry, used to verify the accuracy of the ID information, is started. Here, as in step 4, if a servo interrupt signal is generated, the sequencer branches to the vector 1 instructions.

In step 6, the ID field is read. If a servo interrupt signal occurs during the reading of the ID field, the sequencer branches to vector 1.

In step 7, a CDR count, occurring after the ID code, is read which contains information corresponding to the location of a servo burst within the data field, such as data field 30 in FIG. 2; however, the CDR count may correspond to a servo burst occurring anywhere in the sector. The CDR count is preferably a byte count. This CDR count information is loaded into CDR counter 144 of FIG. 5 which is then decremented as data is being read to identify the location in the data field of the servo burst.

If a servo interrupt signal is generated during step 7, the sequencer branches to vector 1.

In step 8, the CRC field of the sector, such as CRC field 23 in FIG. 2, is read and compared with the CRC generated by disk controller 100 pursuant to step 5. If a servo interrupt signal is generated during step 8, the sequencer branches-to vector 1.

After step 8, the sequencer branches to one of two routines depending upon whether it is desired to write or to read from the disk.

Assuming it is desired to write data to the disk, the sequencer proceeds to step 9A to reset the read gate.

In step 10A, the results of the comparison between the read CRC and the generated CRC determines if there has been an error in the recording or the reading of the ID field. If an error has been detected, the sequencer routine is begun again to reread the ID field, or the sequencer routine is stopped if it is determined that the ID code contains an error.

If there is no CRC error, the sequence proceeds to step 12A, where the ID code containing the cylinder, read/write head, sector code, and flag is compared to the desired ID code containing the data of interest. The desired ID, as previously stated, is generated by firmware in conjunction with microprocessor 114, which cross-references any file name containing the desired data to the ID code containing that data.

If the ID code just read is not identical to the ID code containing the data of interest, the sequencer proceeds to step 13A, wherein the read gate is reset so as not to read any further information from the sector, and the sector is skipped. The routine then returns to step 1 where the next sector is read.

If the comparison of the read ID code with the desired ID code shows that they match, this indicates that the sector is the proper sector to write data into.

A gap, such as gap 24 in FIG. 2, is inserted into the sector to provide the necessary time to perform the logic described with respect to steps 9A–12A. Once it has been determined that the read ID code and desired ID code match, the VFO timing bytes, such as VFO bytes 26 in FIG. 2, are written in step 14A. If a servo interrupt signal is generated during step 14A, the sequencer branches to vector 0, previously discussed, to jump the servo, and the step 14A is repeated.

In step 15A, the data sync, such as data sync 28 in FIG. 2, is written, and the ECC is started. If a servo interrupt signal occurs during step 15A, the sequencer branches to vector 2 (shown in FIG. 6d).

In vector 2, a number of bytes (e.g. 2 bytes) are written to act as a pad, which are never read, to provide a time delay prior to resetting the write gate in disk R/W mechanism 120. This provides the necessary time to allow any data propagating through the deserializer/serializer circuitry 150 to be written on the disk prior to the write gate being reset. The remaining instructions comprising vector 2 include freezing the ECC/CRC, resetting the write gate, and jumping the servo burst; writing the VFO code; writing the data sync code and starting the ECC; and returning to the proper instruction in accordance with the flowchart of FIG. 6e, previously described.

In step 16A, data is written into the data field of the sector.

If a servo interrupt signal is generated during step 16A, the sequencer branches to vector 2.

In step 17A, a flag is reset to indicate the end of the data transfer, and the ECC which has been calculated by a disk controller is written into the ECC field after the data field. If a servo interrupt signal is generated during step 17A, the sequencer branches to vector 2.

In step 18A, a number of pad bytes are written to separate the sector that is written into from a next sector.

In step 19A, if additional sectors are needed to write data into, the routine advances to step 20A which determines the next sector into which data may be written. The steps 1–19A are then repeated as necessary until the data is written onto the disk.

If no further sectors are required to write data onto the disk, the sequencer proceeds from step 19A to step 21A to stop the sequencer routine.

If, after step 8, it has been detected that data is to be read from a particular sector, the sequencer branches to step 9B.

Steps 10B and 12B are similar to steps 10A and 12A previously described. The read CRC is compared with the calculated CRC in step 10B to detect whether the ID code has been recorded and read accurately, and the read ID is compared to the desired ID code in step 12B. If there is no CRC error, and the read ID code does not match the desired ID code, the routine is restarted, and step 2 is again performed for the next sector.

If the read ID code matches with the desired ID code containing the data to be read, sequencer 118 proceeds to step 14B, where the VFO and sync bytes are read after the read gate is set. If a servo interrupt signal is generated during step 14B, the sequencer branches to vector 0 to jump the servo burst, and the VFO and sync bytes are again read. (It is presumed the required sync and VFO information is present after the servo burst information.)

In step 15B, the disk controller aligns the byte boundaries according to the sync byte and starts the ECC. If a servo interrupt signal is generated during step 15B, the sequencer branches to vector 1.

In step 16B, the data is read. If a servo interrupt signal is generated during this step, the sequencer branches to vector 1.

In step 17B, a flag to indicate the end of the data is reset, and the ECC field is read. If a servo interrupt signal is generated during this step, the sequencer branches to vector 1.

In step 18B, the read gate is reset.

In step 19B, if no further sectors are to be read, the routine is stopped in accordance with step 21A. If one or more additional sector need to be read, the sequencer proceeds to step 20B, which begins the program again from step 1 to read a next sector.

Description of Organization of Sequencer Map

A preferred embodiment sequencer map is shown in FIG. 7.

FIG. 7 shows a CDR-soft sectored disk sequencer map. A soft-sectored disk requires the disk controller to locate specific sectors by reading sector ID fields sequentially around a track until the desired sector is found. An index mark on the disk identifies the beginning of a track. The microcode contained in the various addresses is decoded by instruction decoder 134 in FIG. 5 and controls the appropriate functional blocks in FIG. 5 to carry out the specified instructions.

The various bit fields in the microcode for each address in sequencer 118 are shown in FIG. 8. FIG. 8 illustrates a single word in the map of FIG. 7. Fields 200 and 202 together have two functions. In one mode, field 200 contains a three-bit code identifying a condition and instructions to go to a next address depending on if that condition is met. If the condition is not met, sequencer address counter 132 in FIG. 5 is incremented by one. In this mode, the next address to be carried out if the condition is met is contained in five-bit field 202. If the next-address in field 202 is to be executed, that next-address is loaded in sequencer address counter 132. In the preferred embodiment, the conditions and corresponding codes specified in field 200 are:

| | |
|---|---|
| 000 | NXTADD ON CARRY (i.e., jump to next instruction address) |
| 001 | WAIT FOR INDEX+SECTOR, GO TO NXTADD ON TM (time out) |
| 010 | WAIT FOR SYNC, GO TO NXTADD ON TM |
| 011 | WAIT FOR INPUT, GO TO NXTADD ON TM |
| 100 | NXTADD IF FLAG NEQ ELSE ADD + 1 (flag indicates fault in sector) |
| 101 | NXTADD IF CMP NEQ AND ECC GOOD, BRANCH-0 IF ECC ERROR, ELSE ADD + 1 |
| 110 | NXTADD IF FRAM-0 ELSE ADD + 1 |
| 111 | NXTADD IF END OF TRACK ELSE ADD + 1 |

In a second mode, fields 200 and 202, together, are used to store a single byte of firmware information which may be compared to information read from the disk (such as head number), or which may be written onto the disk during formatting (such as a sync byte), or which is not used. The control instructions within a particular address tell the disk controller what to do with the data in these fields.

The function of fields 200 and 202 as either a condition/next-address field or as a data field is determined by the status of bit 214, to be discussed later.

Fields 204, 206, 208, and 210 are control fields. Field 204 identifies the state of an externally generated signal which can be used for diagnostics or to control external devices.

Field 206 provides the following control signals:

| | | |
|---|---|---|
| 00 | NOP (no operation) | |
| 01 | SET RG (read gate) | |
| 10 | SET WG (write gate) | |
| 11 | RESET RG/WG | |

Field 208 provides the following control signals:

| | |
|---|---|
| 00 | NOP |
| 01 | COMPARE |
| 10 | PUSH & COMPARE |
| 11 | FLAG COMP. & PUSH |

And, field 210 provides the following control signals:

| | |
|---|---|
| 000 | NOP |
| 001 | DATA XFER (enables transfer between buffer 154 and disk) |
| 010 | INIT CRC AT SYNC |
| 011 | INIT ECC AT SYNC |
| 100 | ECC FIELD |
| 101 | SECTOR ENABLE |
| 110 | INC. SECTOR POINTER |
| 111 | VFO FIELD |

One of ordinary skill in the art will readily understand the above instructions and instruction codes.

A sequencer count field 212 is one byte long and designates the number of clock counts, signifying a number of bytes, necessary to carry out the instruction in that address. Count field 212 specifies the initial value of the sequencer counter 136, shown in FIG. 5, for the current instruction. Sequencer counter 136 acts like a normal 6-bit counter if bit 7 of count field 212 is clear. As a 6-bit counter, sequencer counter 136 is decremented once per byte period (i.e., every eighth read/write or other reference clock cycles). Sequencer counter 136 acts like a modular 64 counter if bit 7 of count field 212 is set, wherein sequencer counter 136 is then decremented once every 64 bytes. When the count reaches zero, sequencer 118 will execute the appropriate next instruction.

Fields 214, 216, 218, and 220 are used to provide additional or extended control signals. The control and the extended control fields are used to initiate all synchronous data handling operations. The control fields 204, 206, 206, and 210 have control of the normal disk controller functions. The extended fields contain instructions associated with specialized features like CDR, auto sector increment, controlling ECC generation and checking, and instructions involved in jumping over servo areas.

As previously described, field 214 contains a zero bit if fields 200 and 202 are being used as a data field and sequencer address counter 132 is to increment by one. Field 214 contains a one bit when a next-address contained in field 202 is to be loaded into sequencer address counter 132 if the condition specified in field 200 is met.

Field 216 provides the following control signals:

| | |
|---|---|
| 00 | NOP |
| 01 | START OF SECTOR |
| 10 | DISABLE INT. |
| 11 | ID FIELD |

Field 218 provides the following control signals:

| | |
|---|---|
| 00 | NOP |
| 01 | ENABLE MASK |
| 10 | RETURN (return to address stored at time of vector and restore sequencer count if count saved) |
| 11 | READ/WRITE CDR COUNT |

And, field 220 provides the following control signals:

| | |
|---|---|
| 000 | NOP |
| 001 | ID SYNC (to distinguish from data sync) |
| 010 | EN FORMAT REG. |
| 011 | RESET INDEX TIMEOUT |
| 100 | ENABLE ADDR. MARK |
| 101 | SET CMD/DATA STATUS |
| 110 | CLR CDR FIFO |
| 111 | FREEZE ECC |

The above-described instructions are used only for illustration of what type of instructions may be used in sequencer 118.

As seen from the map of FIG. 7, all instructions begin with the "wait for index" instruction. The read gate in disk read/write mechanism 120 is then set to cause the head to read the VFO and sync fields of sectors in a desired track of the disk. (The head is positioned over the desired track by the use of firmware in conjunction with microprocessor 114.) Once the disk controller read/write timing is synchronous with the information on the rotating disk, sequencer 118 controls disk read/write mechanism 120 to read the ID field of a sector. Sequencer 118 then compares the information in the ID field with an ID code, loaded in sequencer 118 by firmware under control of microprocessor 114, to determine if the sector being read is the same as the desired sector.

If it is desired to write into the sector, the write gate in disk read/write mechanism 120 is set, and the VFO, sync, data, and ECC information is written into the sector.

If it is desired to read data from the sector, sequencer 118 issues read instructions to cause disk read/write mechanism 120 to read the VFO and sync fields in order to set the read/write clock and establish the byte boundaries. The data and ECC fields are then read from the sector.

All information read from a disk is first processed by deserializer/serializer 150 to transform incoming information into signals which can be further processed by disk controller 100. Deserializer/serializer 150 also transforms signals into NRZ signals which can be written onto the magnetic disk. The various fields read by disk controller 100 from the disk are temporarily stored in stack 160 to allow time for processing of the read information. Data, however, is routed to FIFO data buffer 154. Data buffer 154 stores, in one embodiment, up to 256 K bytes of data. Data buffer 154 is either a DRAM or an SRAM array.

An error correction code (ECC) algorithm is implemented in hardware ECC circuitry 170 and 172 in disk controller 100 for performing real time error correction encoding and decoding of the data. In the preferred embodiment, disk controller 100 supports 16-bit Cyclic Redundancy Checking (CRC) or 32/56-bit ECC and 88-bit Read-Solomon ECC's for data field error detection.

FIG. 9 shows the preferred embodiment CDR-soft sectored format map for formatting a disk.

FIGS. 10 and 11 show a CDR-hard sectored disk sequencer and format map, respectively. A hard sectored format utilizes physical marks on the disk itself, or uses signals generated by the disk drive itself, to identify the beginning of each sector. The disk controller uses these sector marks as timing marks to coordinate the various read and write control signals. A once-per-revolution drive index pulse marks the beginning of a track and serves as a timing mark to identify the first sector in the track.

Use of Combined Data/Next-Instruction Field in Sequencer Map

Additional control signals are required to be generated by the sequencer map to enable the additional flexibility of the preferred embodiment disk controller, described above. In order to use sequencers which are currently available so as to provide the above-described flexibility at minimum cost, a novel sequencer map arrangement is used in the preferred embodiment.

Prior art sequencer maps contained a dedicated one-byte data field and a separate dedicated next-address field. Thus, in the prior art, one byte of the sequencer map for each address was always dedicated to this data.

Additionally, in the prior art, a separate field of, for example, five bits for a 32 address map is dedicated to a next-address field, which specified a next-address to go to after the instruction was executed.

In the preferred embodiment of the present invention, a single byte of the sequencer map is used for either the data field or the next-address field, as illustrated in FIGS. 7 and 8.

The sequencer knows when the field is being used as a data field or a next-address field by the status of bit 214 in FIG. 8. Thus, at least four bit locations are saved in the sequencer maps of FIGS. 7 and 8.

When a condition code is required to determine if the sequencer needs to go to other than the current-address-plus-one, the data/next-address field 200/202 contains a three-bit condition code and a five bit next address.

When the sequencer is simply reading or writing information from or to the disk, the data/next-address field 200/202 is loaded with the selected information read from or to be written to the disk.

This novel map arrangement allows more room for control instructions to perform tasks.

When fields 200 and 202 are to be used for the condition code and next-address, any data contained in fields 200 and 202 which is desired to be saved may be temporarily stored in a separate register (not shown) external to sequencer 118.

Use of Frames to Efficiently Record Data

One advantageous consequence of the increased flexibility in the disk controller to handle a servo burst virtually anywhere within a sector is the ability to now have a different spacing of servo bursts for each track.

Figure 12A:
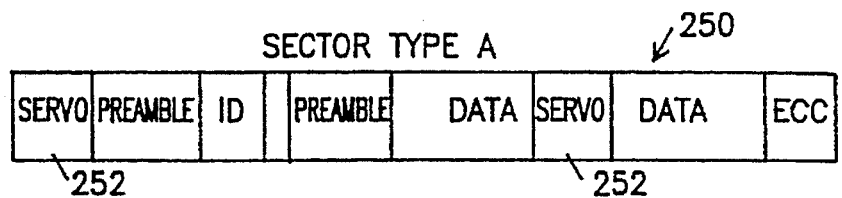
FIGS. 12a, 12b, 12c, 12d and 12e illustrate various sector types and frames which can be used to store information on a disk.

FIG. 12a illustrates a sector 250 (sector type A) having a servo burst 252 occurring within a data field and before a preamble. If this same sector 250 was used around the entire outer track of a disk recorded using CDR, the number of servo bursts around the track would most likely be more than required. To more optimally locate servo bursts around a track, a number of different sector types, each having a different format, may be sequentially arranged as a frame.

Figure 12B:
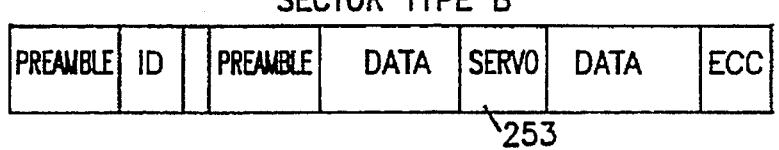

For example, FIG. 12b (sector type B) shows a sector type different from that shown in FIG. 12a (sector type A). In this particular case, sector type B has a single servo burst 253, which is located within a data field. The two sector types A and B may be arranged in a certain combination around a track to optimally space the servo bursts for that track. The location of the servo bursts may be coded into an ID field preceding a servo burst.

Figure 12C:
Figure 12D:
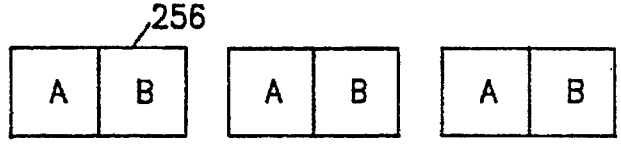

For example, FIG. 12c shows a single frame 254 comprising one sector type A and three sector types B to space the servo burst at relatively distant intervals. This frame format may be used for outer tracks, while the AB frame 256 format of FIG. 12d may be used for the middle tracks to more closely space the servo bursts.

Figure 12E:
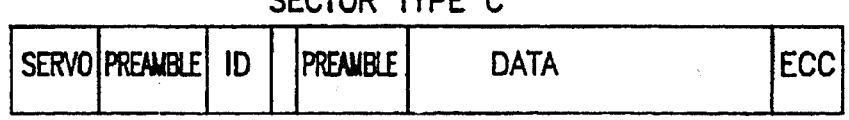

FIG. 12e illustrates a sector type C which has a servo burst at the beginning of the sector. This type of sector may be used by itself around a track or along with sector type B to avoid a servo burst occurring within a data field.

Figure 13:
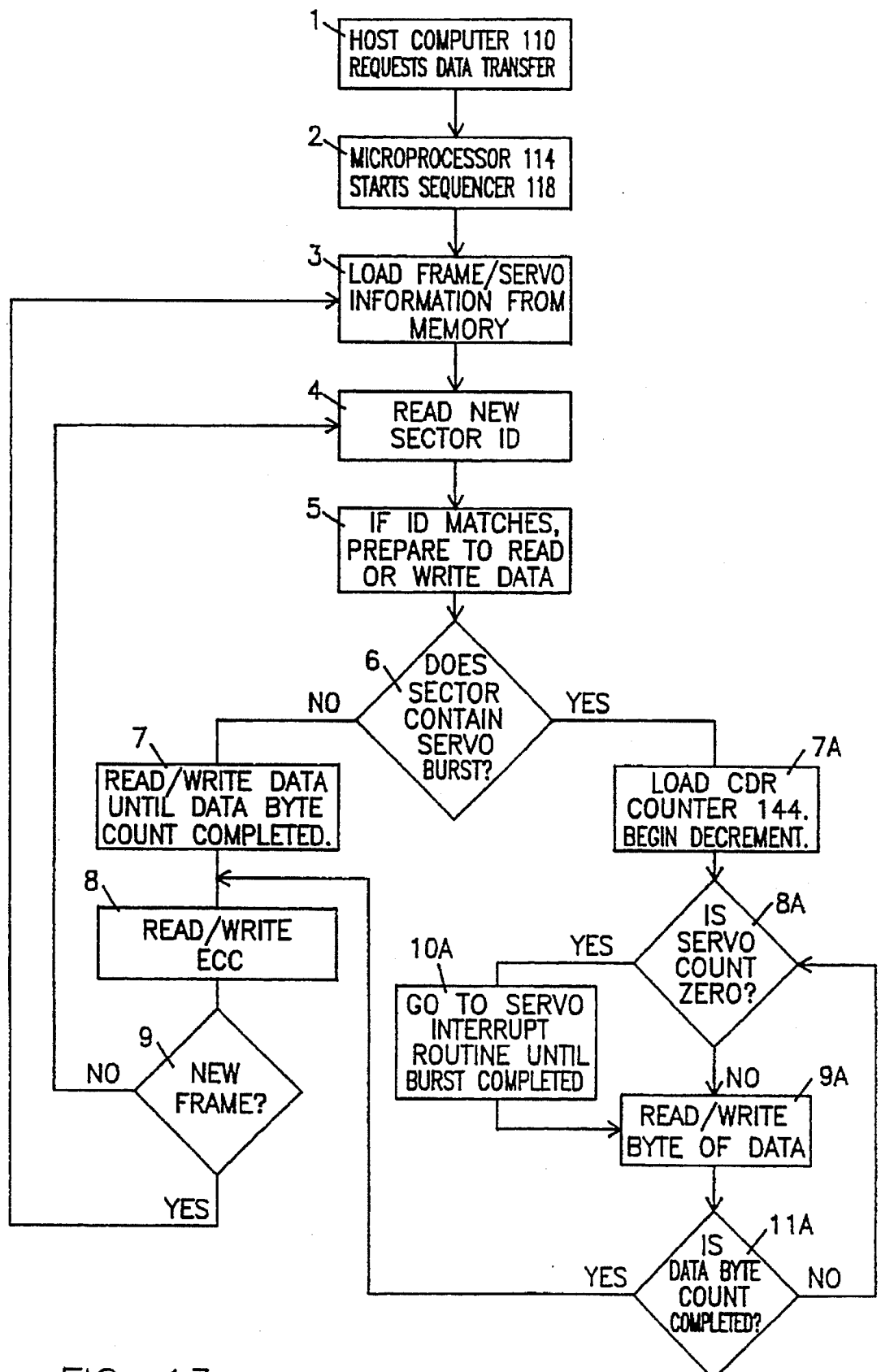
FIG. 13 is a flow chart illustrating how to process a frame of information on a disk.

To process the servo bursts, a procedure generally shown by the flowchart of FIG. 13 may be employed. The frame format used for each track will be known by a memory means within the disk controller beforehand.

As shown by steps 1 and 2 of FIG. 13, the host computer 110 initiates a data transfer, and microprocessor 114 starts sequencer 118.

In step 3, memory means loads into a register information identifying which sectors within the frames on a particular track contain servo bursts.

As shown in step 4, the disk controller controls the head to read the sector ID codes on a certain track.

In step 5, the read ID code of a sector is compared to the desired ID code. If the ID code matches the stored ID code, logic means in step 6, acting upon a control signal generated in step 3, determines if the sector within the frame contains a servo burst. If yes, the routine branches to a routine which can process a servo burst. In this case, any counts until a servo burst occurs are loaded in a counter, as shown in step 7A, to determine when to signal that a branching operation must occur to skip over the servo burst and freeze the ECC. If a servo burst will not occur in that sector, the disk controller implements a routine beginning with step 7 which does not handle servo bursts.

In step 8A, the servo counter is monitored to see if its contents are zero. If not, data is read or written normally, as shown in step 9A. If the servo counter decrements to zero, a servo interrupt routine will take place, as shown in step 10A.

In step 11A, after the servo burst occurs and has been skipped, the routine resumes a normal set of instructions to count the data. After the data field is counted out, the routine joins the non-servo burst routine in step 8 to read or write the ECC.

If a new frame is detected in step 9, the disk controller logic again identifies in step 3 which sector(s) in the frame contain servo bursts so that these sectors will be processed using the servo burst handling routine. If a new frame is not detected, the next sector ID will be read in accordance with step 4.

Many other procedures may be coded into the sequencer map to process frames in accordance with the invention.

Any number of data field bytes may be contained in a sector. The disk controller knows beforehand the sector types arranged on a track and can set the data field count accordingly. In the preferred embodiment, all control information required to process a single frame is stored in the sequencer map.

By using the general flow chart of FIG. 16 any frame format can be processed.

If each frame were comprised of a sector type C, shown in FIG. 12e, followed by any number of sector types B, the first instruction in the flowchart of FIG. 13 would be to count the servo burst bytes. After reading or writing sector type C, the flowchart would then bypass the initial step of counting the servo burst bytes for the following sector types B in the frame. The count for the servo bursts would be loaded with a fixed count or a count which may be different for each track of for each group (e.g. three groups) of tracks.

To format the disk to contain frames, the disk controller is programmed accordingly. FIGS. 14 and 15 show sequencer maps which can be used to program sequencer 118 when using a frame format to record information on a disk.

CONCLUSION

As seen, numerous advantages stem from the increased flexibility provided to a disk controller using the above-described invention. The term disk controller as used herein encompasses those using internal microprocessors as well as external microprocessors to carry out certain instructions provided by logic (e.g., a sequencer, state machine, or other circuitry) within the disk controller.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

I claim:

1. A method of recording data on a magnetic disk comprising the steps of:

grouping a number of sectors on a first track on a magnetic disk so as to form a first frame of sectors, wherein said first frame is repeated around said first track, one or more of said sectors within said first frame being interrupted by a servo burst;

grouping a number of sectors on a second track on said magnetic disk so as to form a second frame of sectors, said second frame being different from said first frame, wherein said second frame is repeated around said second track, one or more of said sectors within said second frame being interrupted by a servo burst; and processing each sector within said first and second frames during reading from or writing to a sector according to whether or not a sector being read from or written to contains a servo burst.

2. The method of claim 1 wherein said magnetic disk further comprises frames, different from said first and said second frames, around tracks other than said first track and said second track.

3. The method of claim 1 further comprising the step of storing, in a memory, a format for each frame on a track.

4. The method of claim 1 wherein the grouping of sectors into said first frame and said second frame is performed so as to optimally locate the servo bursts for each track.

5. A method of formatting a magnetic disk comprising the steps of:

recording a grouping of a number of sectors on a first track on a magnetic disk so as to form a first frame, wherein the first frame is repeated around the first track, one or more of the sectors within the first frame being interrupted by one or more servo bursts;

recording a grouping of a number of sectors on additional tracks on the magnetic disk so as to form additional frames of sectors, at least one of said additional frames being unique and different from the first frame, wherein each of the additional frames are repeated around associated tracks, one or more of the sectors within the additional frames being interrupted by one or more servo bursts; and storing, in a memory, a format for each frame on a track.

6. The method of claim 5 wherein the grouping of sectors into said first frame and said additional frames is performed so as to optimally locate the servo bursts for each track.

7. A computer system comprising:

a CPU;

a magnetic disk controller coupled to the CPU; and a magnetic disk with a plurality of sectors recorded thereon, the magnetic disk controller being capable of processing each sector during reading from or writing to a sector according to whether or not a sector being read from or written to contains a servo burst, and the magnetic disk containing a recorded format including:

a grouping of a number of sectors on a first track on the magnetic disk so as to form a first frame, wherein the first frame is repeated around the first track, one or more of the sectors within the first frame being interrupted by one or more servo bursts; and a grouping of a number of sectors on a second track on the magnetic disk so as to form a second frame of sectors, the second frame being different from the first frame, wherein the second frame is repeated around the second track, one or more of the sectors within the second frame being interrupted by a servo burst.

8. The computer system of claim 7 wherein said magnetic disk further comprises frames, different from said first frame and said second frame, around tracks other than said first track and said second track.

9. The computer system of claim 7 wherein a format for each frame on a track is stored in a memory.

10. The computer system of claim 7 wherein the grouping of sectors into said first frame and said second frame is performed so as to optimally locate the servo bursts for each track.

* * * * *

UNITED STATES PATENT AND TRADEMARK OFFICE
CERTIFICATE OF CORRECTION

PATENT NO.   :   5,627,946
DATED        :   May 6, 1997
INVENTOR(S)  :   Strang, Jr., Clifford E.

It is certified that error appears in the above-identified patent and that said Letters Patent is hereby corrected as shown below:

Col. 6, line 58, delete "15e" and insert --15d--.

Signed and Sealed this

Ninth Day of December, 1997

Attest:

Attesting Officer

BRUCE LEHMAN
Commissioner of Patents and Trademarks